United States Patent
Wong et al.

(10) Patent No.: US 12,369,153 B2
(45) Date of Patent: Jul. 22, 2025

(54) METHODS, COMMUNICATIONS DEVICES, AND INFRASTRUCTURE EQUIPMENT

(71) Applicant: Sony Group Corporation, Tokyo (JP)

(72) Inventors: Shin Horng Wong, Basingstoke (GB); Naoki Kusashima, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 398 days.

(21) Appl. No.: 18/012,995

(22) PCT Filed: Jul. 28, 2021

(86) PCT No.: PCT/EP2021/071231
§ 371 (c)(1),
(2) Date: Dec. 27, 2022

(87) PCT Pub. No.: WO2022/023457
PCT Pub. Date: Feb. 3, 2022

(65) Prior Publication Data
US 2023/0239874 A1 Jul. 27, 2023

(30) Foreign Application Priority Data
Jul. 31, 2020 (EP) ..................................... 20189053

(51) Int. Cl.
*H04W 72/1273* (2023.01)
*H04W 72/23* (2023.01)
*H04W 72/566* (2023.01)

(52) U.S. Cl.
CPC ....... *H04W 72/1273* (2013.01); *H04W 72/23* (2023.01); *H04W 72/566* (2023.01)

(58) Field of Classification Search
CPC ............. H04W 72/1273; H04W 72/23; H04W 72/566; H04L 1/1854; H04L 5/0064; H04L 1/1621; H04L 5/0055
See application file for complete search history.

(56) References Cited

U.S. PATENT DOCUMENTS

| 12,255,740 B2* | 3/2025 | Khoshnevisan ...... H04W 72/23 |
| 2021/0006356 A1* | 1/2021 | Khoshnevisan ...... H04L 1/1854 |

(Continued)

FOREIGN PATENT DOCUMENTS

| EP | 3657721 A1 | 5/2020 |
| WO | 2018/231728 A1 | 12/2018 |
| WO | 2022/018230 A1 | 1/2022 |

OTHER PUBLICATIONS

International Search Report and Written Opinion mailed on Nov. 29, 2021, received for PCT Application PCT/EP2021/071231, filed on Jul. 28, 2021, 12 pages.

(Continued)

*Primary Examiner* — Hoang-Chuong Q Vu
(74) *Attorney, Agent, or Firm* — XSENSUS LLP

(57) ABSTRACT

A method of operating a communications device comprises: determining to transmit a first uplink signal comprising a first set of feedback indications in a first set of uplink resources; determining to transmit a second uplink signal comprising a second set of feedback indications in a second set of uplink resources; determining that the first set of uplink resources and the second set of uplink resources are located within a same time slot; transmitting only the second uplink signal instead of both of the first uplink signal and the second uplink signal, the second uplink signal comprising an indication of one or more of the first set of feedback indications; and determining that a downlink assignment index associated with the first set of feedback indications is reduced when the one or more of the first set of feedback indications are indicated within the second uplink signal.

20 Claims, 10 Drawing Sheets

(56) References Cited

U.S. PATENT DOCUMENTS

| | | | |
|---|---|---|---|
| 2021/0234643 A1* | 7/2021 | Wang | H04L 1/1887 |
| 2022/0294591 A1* | 9/2022 | Liu | H04L 5/0055 |
| 2023/0055619 A1* | 2/2023 | Li | H04W 72/1273 |
| 2023/0093477 A1* | 3/2023 | El Hamss | H04L 1/1861 |

OTHER PUBLICATIONS

Holma et al., "LTE for UMTS OFDMA and SC-FDMA Based Radio Access", John Wiley & Sons, 2009, 232 pages.

Huawei et al., "New WID: Physical Layer Enhancements for NR Ultra-Reliable and Low Latency Communication (URLLC)", 3GPP TSG RAN Meeting #83, RP-190726, Mar. 18-21, 2019, 5 pages.

Nokia et al., "Revised WID: Enhanced Industrial Internet of Things (IOT) and ultra-reliable and low latency communication (URLLC) support for NR", 3GPP TSG RAN Meeting #88e, RP-201310, Jun. 29-Jul. 3, 2020, 6 pages.

3GPP, "Study on Scenarios and Requirements for Next Generation Access Technologies; (Release 14)", 3GPP TR 38.913 V14.3.0, Jun. 2017, pp. 1-39.

Wilus Inc., "Remaining Issues on UCI enhancement for NR URLLC", 3GPP TSG RAN WG1 #99, R1-1913068, Nov. 18-22, 2019, 7 pages.

* cited by examiner

METHODS, COMMUNICATIONS DEVICES, AND INFRASTRUCTURE EQUIPMENT

CROSS-REFERENCE TO RELATED APPLICATIONS

The present application is based on PCT filing PCT/EP2021/071231, filed Jul. 28, 2021, which claims priority to European Patent Application No. 20189053.0, filed Jul. 31, 2020, the entire contents of each are incorporated herein by reference.

BACKGROUND

Field of Disclosure

The present disclosure relates to communications devices, infrastructure equipment and methods for the transmission of data by a communications device in a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Latest generation mobile telecommunication systems, such as those based on the 3GPP defined UMTS and Long Term Evolution (LTE) architecture, are able to support a wider range of services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, is expected to continue to increase rapidly.

Future wireless communications networks will be expected to routinely and efficiently support communications with an ever increasing range of devices associated with a wider range of data traffic profiles and types than existing systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance. Other types of device, for example supporting high-definition video streaming, may be associated with transmissions of relatively large amounts of data with relatively low latency tolerance. Other types of device, for example used for autonomous vehicle communications and for other critical applications, may be characterised by data that should be transmitted through the network with low latency and high reliability. A single device type might also be associated with different traffic profiles/characteristics depending on the application(s) it is running For example, different consideration may apply for efficiently supporting data exchange with a smartphone when it is running a video streaming application (high downlink data) as compared to when it is running an Internet browsing application (sporadic uplink and downlink data) or being used for voice communications by an emergency responder in an emergency scenario (data subject to stringent reliability and latency requirements).

In view of this there is expected to be a desire for future wireless communications networks, for example those which may be referred to as 5G or new radio (NR) systems/new radio access technology (RAT) systems, as well as future iterations/releases of existing systems, to efficiently support connectivity for a wide range of devices associated with different applications and different characteristic data traffic profiles and requirements.

One example of a new service is referred to as Ultra Reliable Low Latency Communications (URLLC) services which, as its name suggests, requires that a data unit or packet be communicated with a high reliability and with a low communications delay. Another example of a new service is Enhanced Mobile Broadband (eMBB) services, which are characterised by a high capacity with a requirement to support up to 20 Gb/s. URLLC and eMBB type services therefore represent challenging examples for both LTE type communications systems and 5G/NR communications systems.

The increasing use of different types of network infrastructure equipment and terminal devices associated with different traffic profiles give rise to new challenges for efficiently handling communications in wireless communications systems that need to be addressed.

SUMMARY OF THE DISCLOSURE

The present disclosure can help address or mitigate at least some of the issues discussed above.

Embodiments of the present technique can provide a method of operating a communications device in a wireless communications network. The method comprises determining, based on one or more first downlink control signals received from the wireless communications network, that the communications device is to transmit a first uplink signal comprising a first set of feedback indications associated with a first priority level to the wireless communications network in a first set of uplink resources of a wireless access interface, the first set of feedback indications each indicating whether one of one or more first downlink data signals each scheduled by one of the first downlink control signals have been successfully received by the communications device, determining, based on one or more second downlink control signals received from the wireless communications network, that the communications device is to transmit a second uplink signal comprising a second set of feedback indications associated with a second priority level different to the first priority level to the wireless communications network in a second set of uplink resources of the wireless access interface, the second set of feedback indications each indicating whether one of one or more second downlink data signals each scheduled by one of the second downlink control signals have been successfully received by the communications device, determining that the first set of uplink resources and the second set of uplink resources are located within a same time slot or time sub-slot of the wireless access interface, transmitting only the second uplink signal to the wireless communications network instead of both of the first uplink signal and the second uplink signal, the second uplink signal comprising an indication of one or more of the first set of feedback indications, and determining that a downlink assignment index, DAI, associated with the first set of feedback indications is reduced when the one or more of the first set of feedback indications are indicated within the second uplink signal.

Embodiments of the present technique, which, in addition to methods of operating communications devices, relate to methods of operating infrastructure equipment, communications devices and infrastructure equipment, and circuitry for communications devices and infrastructure equipment, allow for more efficient use of radio resources by a communications device.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1:
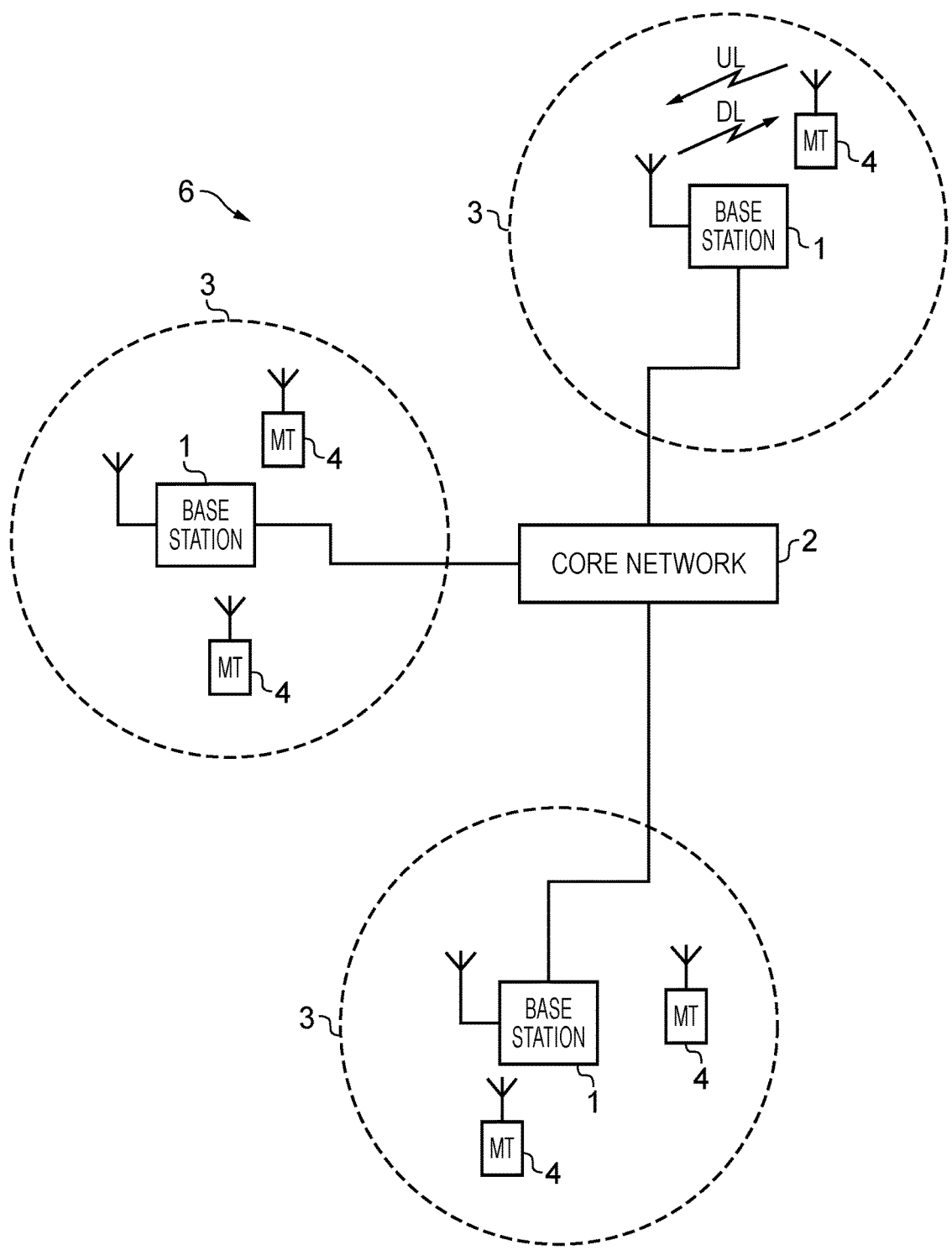
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 6 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [1]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 6 includes a plurality of base stations 1 connected to a core network 2. Each base station provides a coverage area 3 (i.e. a cell) within which data can be communicated to and from communications devices 4. Although each base station 1 is shown in FIG. 1 as a single entity, the skilled person will appreciate that some of the functions of the base station may be carried out by disparate, inter-connected elements, such as antennas (or antennae), remote radio heads, amplifiers, etc. Collectively, one or more base stations may form a radio access network.

Data is transmitted from base stations 1 to communications devices 4 within their respective coverage areas 3 via a radio downlink. Data is transmitted from communications devices 4 to the base stations 1 via a radio uplink. The core network 2 routes data to and from the communications devices 4 via the respective base stations 1 and provides functions such as authentication, mobility management, charging and so on. Terminal devices may also be referred to as mobile stations, user equipment (UE), user terminal, mobile radio, communications device, and so forth. Services provided by the core network 2 may include connectivity to the internet or to external telephony services. The core network 2 may further track the location of the communications devices 4 so that it can efficiently contact (i.e. page) the communications devices 4 for transmitting downlink data towards the communications devices 4.

Base stations, which are an example of network infrastructure equipment, may also be referred to as transceiver stations, nodeBs, e-nodeBs, eNB, g-nodeBs, gNB and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
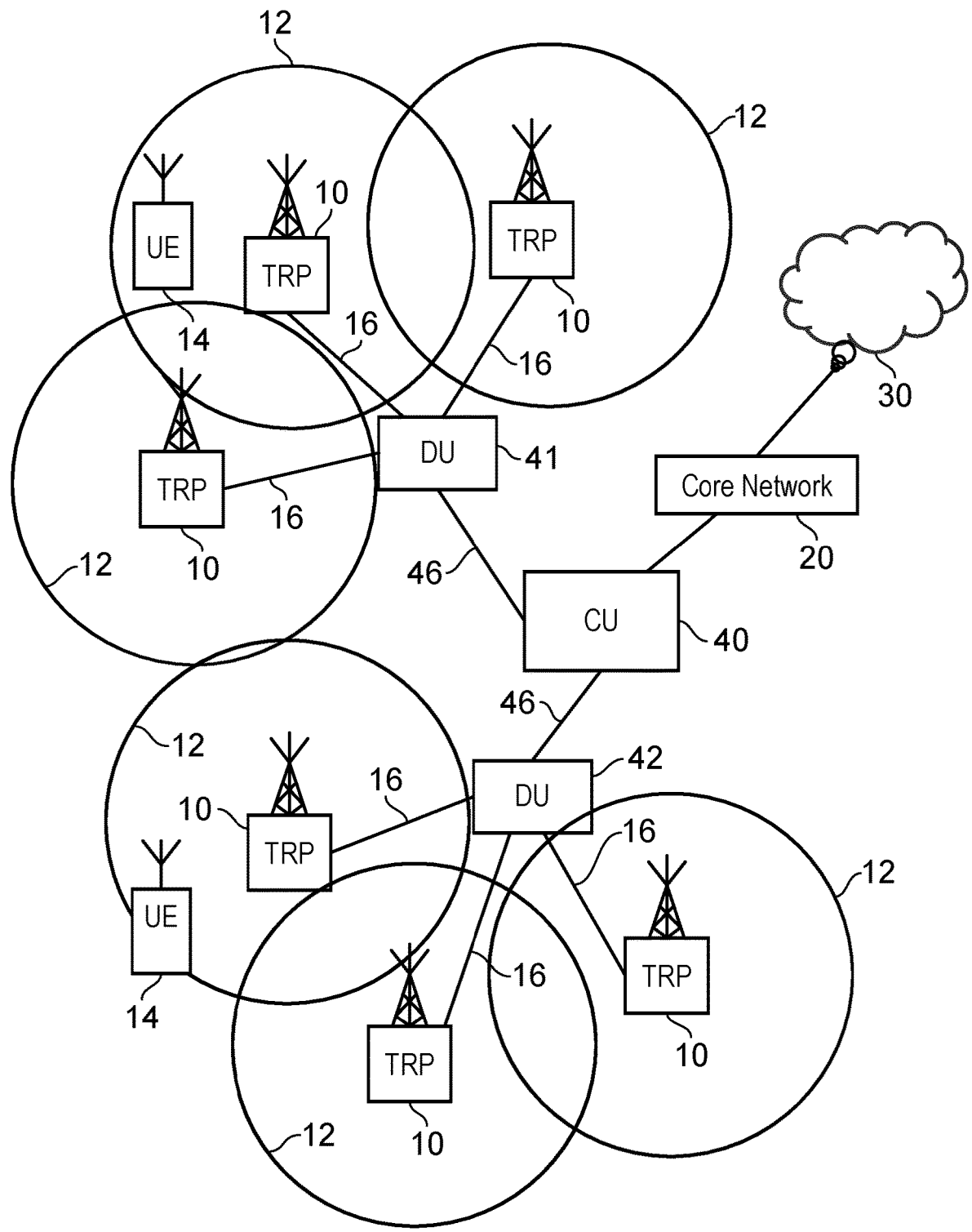
FIG. 2 schematically represents some aspects of a new radio access technology (RAT) wireless telecommunications system which may be configured to operate in accordance with certain embodiments of the present disclosure.

An example configuration of a wireless communications network which uses some of the terminology proposed for and used in NR and 5G is shown in FIG. 2. In FIG. 2 a plurality of transmission and reception points (TRPs) 10 are connected to distributed control units (DUs) 41, 42 by a connection interface represented as a line 16. Each of the TRPs 10 is arranged to transmit and receive signals via a wireless access interface within a radio frequency bandwidth available to the wireless communications network. Thus, within a range for performing radio communications via the wireless access interface, each of the TRPs 10, forms a cell of the wireless communications network as represented by a circle 12. As such, wireless communications devices 14 which are within a radio communications range provided by the cells 12 can transmit and receive signals to and from the TRPs 10 via the wireless access interface. Each of the distributed units 41, 42 are connected to a central unit (CU) 40 (which may be referred to as a controlling node) via an interface 46. The central unit 40 is then connected to the core network 20 which may contain all other functions required to transmit data for communicating to and from the wireless communications devices and the core network 20 may be connected to other networks 30.

The elements of the wireless access network shown in FIG. 2 may operate in a similar way to corresponding elements of an LTE network as described with regard to the example of FIG. 1. It will be appreciated that operational aspects of the telecommunications network represented in FIG. 2, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 10 of FIG. 2 may in part have a corresponding functionality to a base station or eNodeB of an LTE network. Similarly, the communications devices 14 may have a functionality corresponding to the UE devices 4 known for operation with an LTE network. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and communications devices of a new RAT network will be functionally similar to, respectively, the core network component, base stations and communications devices of an LTE wireless communications network.

In terms of broad top-level functionality, the core network 20 connected to the new RAT telecommunications system represented in FIG. 2 may be broadly considered to correspond with the core network 2 represented in FIG. 1, and the respective central units 40 and their associated distributed units/TRPs 10 may be broadly considered to provide functionality corresponding to the base stations 1 of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the communications devices may lie with the controlling node/central unit and/or the distributed units/TRPs. A communications device 14 is represented in FIG. 2 within the coverage area of the first communication cell 12. This communications device 14 may thus exchange signalling with the first central unit 40 in the first communication cell 12 via one of the distributed units 10 associated with the first communication cell 12.

It will further be appreciated that FIG. 2 represents merely one example of a proposed architecture for a new RAT based telecommunications system in which approaches in accordance with the principles described herein may be adopted, and the functionality disclosed herein may also be applied in respect of wireless telecommunications systems having different architectures.

Thus, certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 1 as shown in FIG. 1 which is adapted to provide functionality in accordance with the principles described herein, and in other examples the network infrastructure equipment may comprise a control unit/controlling node 40 and/or a TRP 10 of the kind shown in FIG. 2 which is adapted to provide functionality in accordance with the principles described herein.

Figure 3:
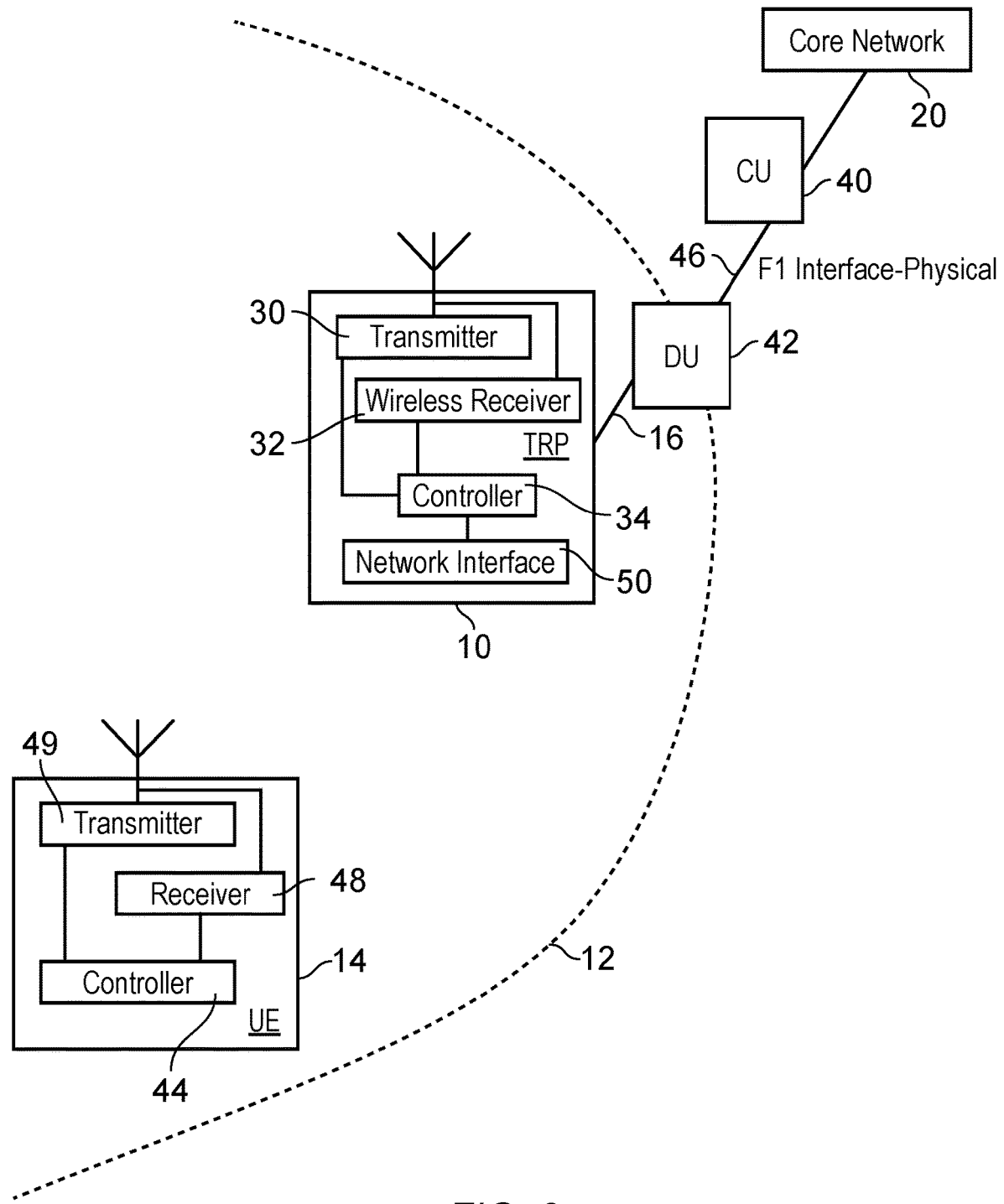
FIG. 3 is a schematic block diagram of an example infrastructure equipment and communications device which may be configured to operate in accordance with certain embodiments of the present disclosure.

A more detailed diagram of some of the components of the network shown in FIG. 2 is provided by FIG. 3. In FIG. 3, a TRP 10 as shown in FIG. 2 comprises, as a simplified representation, a wireless transmitter 30, a wireless receiver 32 and a controller or controlling processor 34 which may operate to control the transmitter 30 and the wireless receiver 32 to transmit and receive radio signals to one or more UEs 14 within a cell 12 formed by the TRP 10. As shown in FIG. 3, an example UE 14 is shown to include a corresponding transmitter 49, a receiver 48 and a controller 44 which is configured to control the transmitter 49 and the receiver 48 to transmit signals representing uplink data to the wireless communications network via the wireless access interface formed by the TRP 10 and to receive downlink data as signals transmitted by the transmitter 30 and received by the receiver 48 in accordance with the conventional operation.

The transmitters 30, 49 and the receivers 32, 48 (as well as other transmitters, receivers and transceivers described in relation to examples and embodiments of the present disclosure) may include radio frequency filters and amplifiers as well as signal processing components and devices in order to transmit and receive radio signals in accordance for example with the 5G/NR standard. The controllers 34, 44, 48 (as well as other controllers described in relation to examples and embodiments of the present disclosure) may be, for example, a microprocessor, a CPU, or a dedicated chipset, etc., configured to carry out instructions which are stored on a computer readable medium, such as a non-volatile memory. The processing steps described herein may be carried out by, for example, a microprocessor in conjunction with a random access memory, operating according to instructions stored on a computer readable medium. The transmitters, the receivers and the controllers are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment/TRP/base station as well as the UE/communications device will in general comprise various other elements associated with its operating functionality.

As shown in FIG. 3, the TRP 10 also includes a network interface 50 which connects to the DU 42 via a physical interface 16. The network interface 50 therefore provides a communication link for data and signalling traffic from the TRP 10 via the DU 42 and the CU 40 to the core network 20.

The interface 46 between the DU 42 and the CU 40 is known as the F1 interface which can be a physical or a logical interface. The F1 interface 46 between CU and DU may operate in accordance with specifications 3GPP TS 38.470 and 3GPP TS 38.473, and may be formed from a fibre optic or other wired high bandwidth connection. In one example the connection 16 from the TRP 10 to the DU 42 is via fibre optic. The connection between a TRP 10 and the core network 20 can be generally referred to as a backhaul, which comprises the interface 16 from the network interface 50 of the TRP 10 to the DU 42 and the F1 interface 46 from the DU 42 to the CU 40.

5G and eURLLC

Systems incorporating NR technology are expected to support different services (or types of services), which may be characterised by different requirements for latency, data rate and/or reliability. For example, Enhanced Mobile Broadband (eMBB) services are characterised by high capacity with a requirement to support up to 20 Gb/s. The requirements for Ultra Reliable and Low Latency Communications (URLLC) services are for a reliability of $1-10^{-5}$ (99.999%) or higher for one transmission of a 32 byte packet is required to be transmitted from the radio protocol layer 2/3 SDU ingress point to the radio protocol layer 2/3 SDU egress point of the radio interface within 1 ms with a reliability of 99.999% to 99.9999% [2]. Massive Machine Type Communications (mMTC) is another example of a service which may be supported by NR-based communications networks. In addition, systems may be expected to support further enhancements related to Industrial Internet of Things (IIoT) in order to support services with new requirements of high availability, high reliability, low latency, and in some cases, high-accuracy positioning. Enhanced URLLC (eURLLC) [3][4] specifies features that require high reliability and low latency, such as factory automation, transport industry, electrical power distribution, etc. It should be appreciated that the Uplink Control Information (UCI) for URLLC and eMBB will have different requirements. Hence, one of the current objectives of eURLLC is to enhance the UCI to support URLLC, where the aim is to allow more frequent UCI to be transmitted, such as the transmission of more Hybrid Automatic Repeat Request Acknowledgement (HARQ-ACK) feedback per slot, and to support multiple HARQ-ACK codebooks for different traffic services. Solutions identified to accommodate more frequent UCI without interrupting the high-priority and low-latency data transmissions using Physical Uplink Shared Channels (PUSCHs) can comprise the multiplexing of UCI onto PUSCH repetitions.

Rel-15 HARQ-ACK and PUSCH Multiplexing

A PUCCH carries Uplink Control Information (UCI), such as HARQ-ACK feedback for PDSCH, Scheduling Requests (SRs) and Channel State Information (CSI). There are 5 PUCCH formats, namely Format 0, 1, 2, 3 and 4. PUCCH Format 0 carries up to 2 HARQ-ACK bits and a positive SR. PUCCH Format 1 carries up to 2 bits of information which can be either 2 HARQ-ACK bits or 1 HARQ-ACK and 1 SR bit. PUCCH Formats 2, 3 and 4 can carry more than 2 bits, which can consist of HARQ-ACK, SRs and CSI. It should be noted that HARQ-ACK is a term of art used to describe HARQ feedback for a PDSCH, where despite the name the feedback itself can be either a positive acknowledgement (termed ACK) or a negative acknowledgement (termed NACK).

A HARQ-ACK feedback is transmitted to the gNB, in response to Physical Downlink Shared Channel (PDSCH) scheduling, to inform the gNB whether the UE has successfully decoded the PDSCH or not. For a PDSCH ending in slot n, the corresponding PUCCH carrying the HARQ-ACK is transmitted in slot $n+K_1$, where the value of $K_1$ is indicated in the field PDSCH-to-HARQ_feedback timing indicator of the DL Grant (carried by Downlink Control Information (DCI) Format 1_0 or DCI Format 1_1). The PUCCH resource used is indicated in the PUCCH Resource Indicator (PRI) field of the DL Grant.

Figure 4:
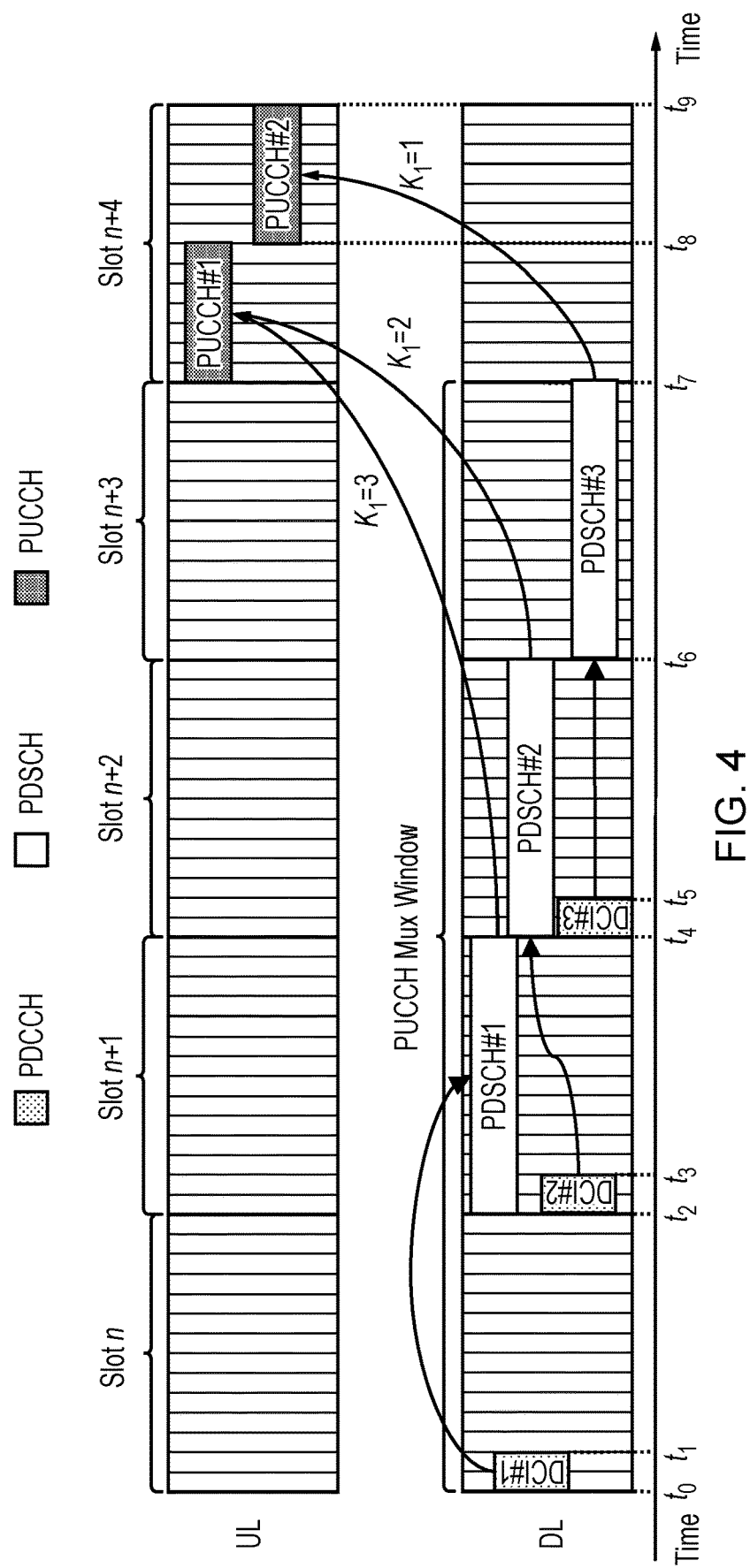
FIG. 4 shows a flow diagram illustrating a process of how a User Equipment (UE) may multiplex multiple Hybrid Automatic Repeat Request Acknowledgements (HARQ-ACKs) into a single Physical Uplink Control Channel (PUCCH)

Multiple (different) PDSCHs can point to the same slot for transmissions of their respective HARQ-ACKs and the bits of these HARQ-ACKs (in the same slot) are then multiplexed by the UE into a single PUCCH, where the PUCCH resource is determined by the DL Grant scheduling the last PDSCH. Hence, a PUCCH can contain multiple HARQ-ACKs for multiple PDSCHs. An example is shown in FIG. 4, in which three DL Grants are transmitted to the UE via DCI #1, DCI #2 and DCI #3 in slot n, n+1 and n+2 respectively. DCI #1, DCI #2 and DCI #3 schedule PDSCH #1, PDSCH #2 and PDSCH #3 respectively. DCI #1, DCI #2 and DCI #3 further indicate $K_1=3$, $K_1=2$ and $K_1=1$ respectively. Since the $K_1$ values indicate that the HARQ-ACK feedbacks for PDSCH #1, PDSCH #2 and PDSCH #3 are all transmitted in slot n+4, the UE multiplexes all three of these HARQ-ACKs into a single PUCCH. The PUCCH Multiplexing Window is a time window during which PDSCHs can be multiplexed into that single PUCCH, where this PUCCH Multiplexing Window depends on the range of $K_1$ values. In the example shown by FIG. 4, the PUCCH Multiplexing Window is from Slot n to Slot n+3, which means the max $K_1$ value is 4 slots.

In Rel-15, only one PUCCH per slot is allowed to carry HARQ-ACKs for the same UE even if the different PUCCHs do not overlap in time. The PUCCH resource is indicated in the PUCCH Resource Indicator (PRI) field in the DL Grant. Each DL Grant may indicate a different PUCCH resource, but the UE will follow the PRI indicated in the DL Grant for the last PDSCH in the PUCCH Multiplexing Window since the UE only knows the total number of HARQ-ACK bits after the last DL Grant is received. In the example shown by FIG. 4, DCI #1 and DCI #2 both indicate PUCCH #1 for the HARQ-ACK, but DCI #3 indicates PUCCH #2, where PUCCH #1 and PUCCH #2 do not overlap in time. Since DCI #3 schedules the last PDSCH, i.e. PDSCH #3, in the Multiplexing Window, the UE will use PUCCH #2 to carry the HARQ-ACK for PDSCH #1, PDSCH #2 and PDSCH #3. It should be noted that a PUCCH carrying other UCI such as SRs can be transmitted separately to a PUCCH carrying HARQ-ACK within the same slot, if they do not overlap in time.

A HARQ-ACK codebook is used to carry multiple HARQ-ACK feedbacks for PDSCHs. In Rel-15 there are two types of HARQ-ACK codebooks:

Type 1 HARQ-ACK codebook: Also known as semi-static HARQ-ACK codebook where the number of HARQ-ACK entries is fixed, i.e. semi-statically configured by RRC. Since the HARQ-ACK entries are fixed, there is no confusion between UE and gNB on the number of HARQ-ACK feedbacks the UE should transmit to the gNB if the UE missed a DL Grant (i.e. missed a PDSCH). However, the use of Type 1 codebooks may waste resources, since they still comprise NACKs for any PDSCHs that are not scheduled; and Type 2 HARQ-ACK codebook: Also known as dynamic HARQ-ACK codebook where the number of HARQ-ACK entries is dynamic and based on the actual number of PDSCHs being received. To avoid misalignment on the number of HARQ-ACK feedbacks required due to UE missing DL Grants, a Downlink Assignment Index (DAI) is used to keep track of the number of PDSCH transmitted to the UE. The DAI is included in the DL Grant and is incremented when the gNB schedules a PDSCH to the UE using Type 2 HARQ-ACK codebook.

Downlink Assignment Indicator (DAI)

The Downlink Assignment Index (DAI) is used for dynamic HARQ-ACK codebook (e.g. Type 2 and enhanced Type 2 for NR in unlicensed spectrum (NR-U)) by the UE to keep track of the number of PDSCHs scheduled by the gNB to ensure that the correct number of HARQ-ACK feedbacks are sent to the gNB. The DAI is indicated in the DCI field Downlink Assignment Index of the DL Grant (DCI Format 1_0 or 1_1). There are two types of DAIs; Counter DAI (C-DAI) and Total DAI (T-DAI), where typically the C-DAI is the 2 most significant bits of the DAI field and T-DAI is the 2 least significant bits of the DAI field.

C-DAI is configured for a dynamic HARQ-ACK codebook and consists of 2 bits, which are incremented whenever a PDSCH is scheduled for the UE. When the number of PDSCH exceeds 4, the counter wraps around to 0. The UE keeps track of the number of times C-DAI wraps around and by doing so can determine the number of PDSCH being scheduled. As long as the UE does not miss 4 or more consecutive DL Grants, the UE is able to keep track of the number of scheduled PDSCH.

T-DAI may be configured for a dynamic HARQ-ACK codebook typically when multiple carriers are used, and also consists of 2 bits. T-DAI gives the total number of PDSCHs the gNB schedules the UE across all serving cells (in a multiple carriers operation) within a PDSCH Occasion.

Figure 5:
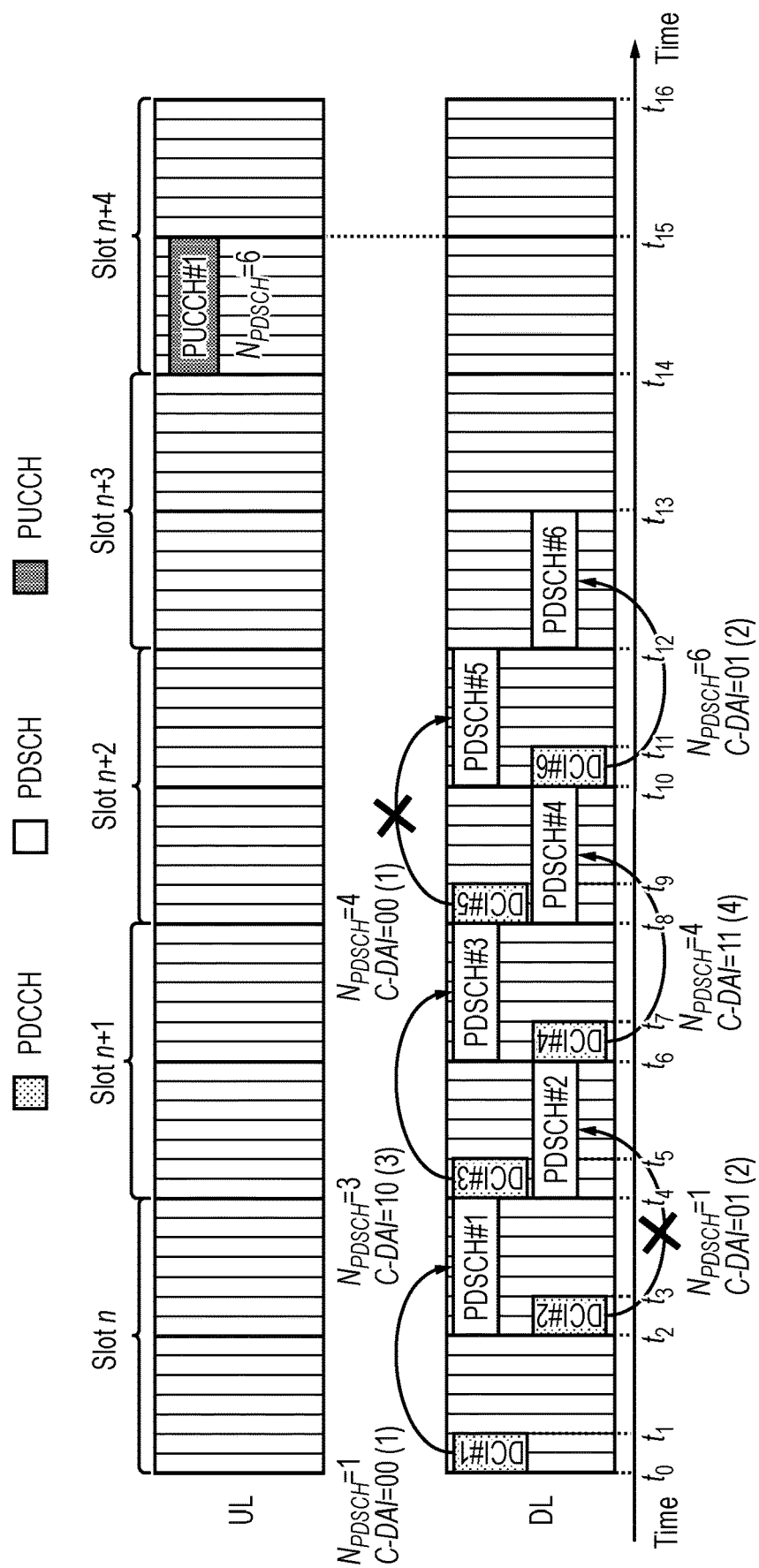
FIG. 5 shows an example operation of a downlink assignment indicator (DAI)

An example of C-DAI in a single serving cell (where T-DAI is not configured) operation is shown in FIG. 5. Here C-DAI is the actual bits indicated in the DL Grant, where "00"=1, "01"=2, "10"=3 and "11"=4 (i.e. the number starts from 1). $N_{PDSCH}$ is the UE's internal counter on the number of PDSCH received for the dynamic HARQ-ACK codebook (Type 2 or enhanced Type 2). DL Grants DCI #1, DCI #2, DCI #3, DCI #4, DCI #5 and DCI #6 schedules PDSCH #1, PDSCH #2, PDSCH #3, PDSCH #4, PDSCH #5 and PDSCH #6 respectively, where all their HARQ-ACK feedbacks are to be multiplexed into PUCCH #1 in Slot n+4. The UE receives the $1^{st}$ DL Grant, DCI #1 successfully where it indicates C-DAI=1 and so the UE updates its internal counter $N_{PDSCH}$=1. The UE missed DCI #2 and so at time $t_3$ it still assumes $N_{PDSCH}$=1. At time $t_4$, it receives DCI #3 where it expects C-DAI=2 but instead C-DAI=3 is indicated and so the UE realises it has missed a PDSCH and updates its counter $N_{PDSCH}$=3. The UE receives DCI #4, where C-DAI matches its internal counter and updates $N_{PDSCH}$=4. The UE misses DCI #5 but receives DCI #6 and using the same procedure it is able to determine that it has missed PDSCH #5. The UE corrects its internal counter to $N_{PDSCH}$=6 and multiplexes 6 HARQ-ACKs feedbacks into PUCCH #1, where it indicates NACK for those PDSCH (PDSCH #2 and PDSCH #5) that it has missed, and transmits PUCCH #1 to the gNB.

Rel-16 eURLLC

Figure 6:
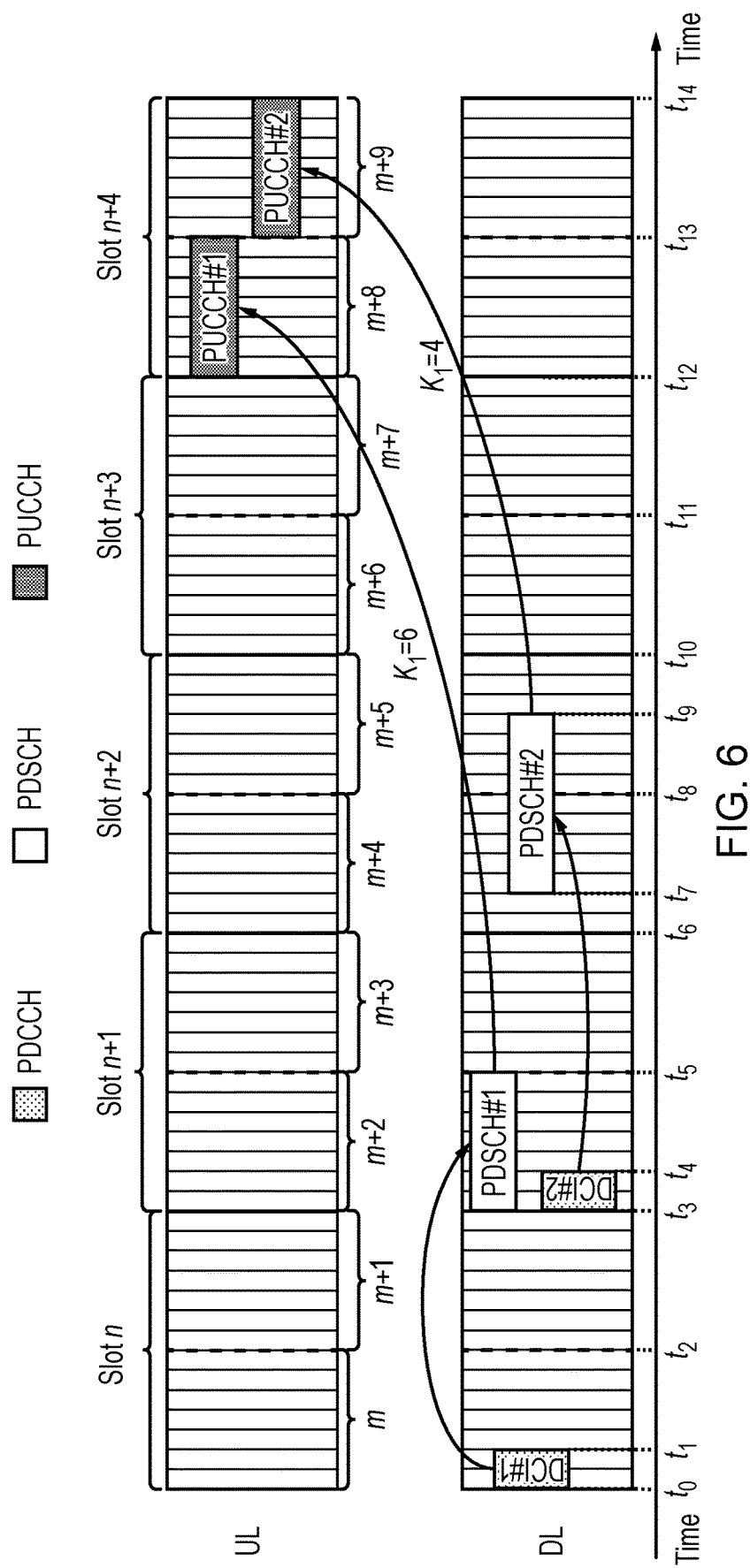
FIG. 6 shows an example sub-slot based PUCCH.

In Rel-16 eURLLC, sub-slot PUCCH is introduced for carrying HARQ-ACK for URLLC PDSCH. Sub-slot based PUCCH allows more than one PUCCH carrying HARQ-ACKs to be transmitted within a slot. This gives more opportunity for PUCCH carrying HARQ-ACK for PDSCHs to be transmitted within a slot, thereby reducing latency for HARQ-ACK feedbacks. In a sub-slot based PUCCH, the granularity of the $K_1$ parameter (i.e. the time difference between the end of a PDSCH and the start of its corresponding PUCCH) is in units of sub-slot instead of slot, where the sub-slot size can be 2 symbols or 7 symbols. An example is shown in FIG. 6, where the sub-slot size=7 symbols (i.e. half a slot) and the sub-slots are labelled as m, m+1, m+2, etc. PDSCH #1 is transmitted in slot n+1 but for sub-slot based HARQ-ACK PUCCH, it is transmitted in sub-slot m+2, and here $K_1$=6 which means that the corresponding HARQ-ACK is in sub-slot m+2+$K_1$=m+8. PDSCH #2 is transmitted in slot n+2 but occupies sub-slot m+4 and m+5. The reference for $K_1$ is relative to the sub-slot where the PDSCH ends and in this case PDSCH #2 ends in sub-slot m+5. The DL Grant in DCI #2 that schedules PDSCH #2 indicates $K_1$=4 which schedules a PUCCH for its HARQ-ACK at sub-slot m+5+$K_1$=sub-slot m+9.

In Rel-15, there are no priority levels at the Physical Layer, and when two UL transmissions collide, their information is multiplexed and transmitted using a single channel. The possible collisions are PUCCH with PUCCH and PUCCH with PUSCH. Those skilled in the art would be aware that priority levels are defined for the MAC layer in Rel-15, where there are sixteen priority levels.

A UE can be configured to provide both eMBB and URLLC services. Since eMBB and URLLC have different latency requirements, their uplink transmissions may collide. For example, after an eMBB uplink transmission has been scheduled, an urgent URLLC packet may arrive, which would need to be scheduled immediately, and its transmission may collide with the eMBB transmission. In order to handle such intra-UE collisions with different latency and reliability requirements, two priority levels at the Physical Layer were introduced in Rel-16 for Uplink transmissions, i.e. PUCCH and PUSCH. In Rel-16 intra-UE prioritisation is used, that is, when two UL transmissions with different Physical Layer priority levels (L1 priority) collide, the UE will drop the lower priority transmission. If both UL transmissions have the same L1 priorities then the UE reuse Rel-15 procedures; i.e. one of the transmissions can be multiplexed onto the PUSCH/PUCCH which carries the other. The gNB indicates the L1 priority to the UE in the 1 bit Priority indicator DCI field, where "0" indicates Low L1 priority and "1" indicates High L1 priority and:

For a PUSCH, the L1 priority is indicated in the UL Grant carried by DCI Format 0_1 and 0_2; and For a PUCCH carrying HARQ-ACK feedback for PDSCH, the L1 priority is indicated in the DL Grant scheduling the PDSCH for which the HARQ-ARK feedback in the PUCCH relate, carried by DCI Format 1_1 and 1_2.

Figure 7:
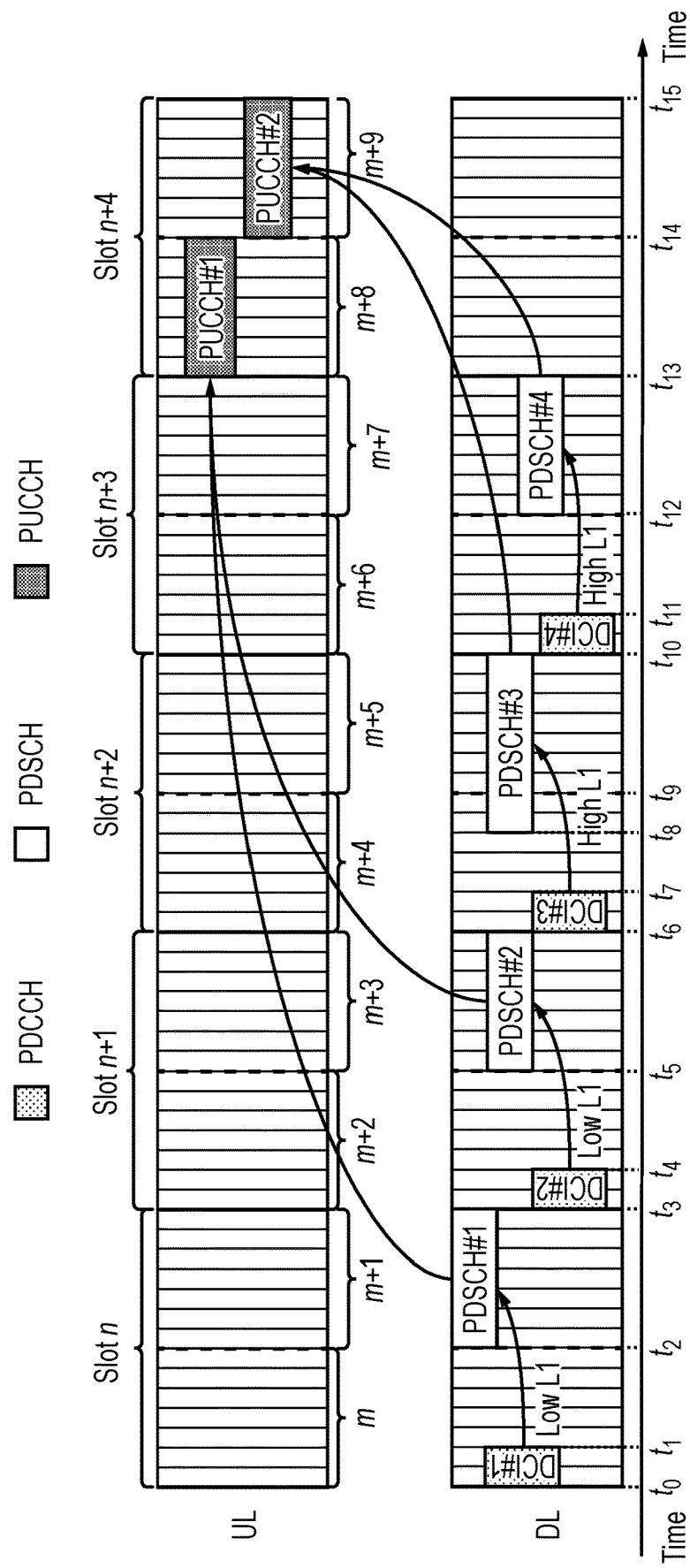
FIG. 7 shows an example of how two HARQ-ACK codebooks may have different priorities.

Since the PUCCH can have two L1 priorities, two HARQ-ACK codebooks of different priorities can be configured for a UE. This allows High L1 priority HARQ-ACKs to be multiplexed into a High L1 priority HARQ-ACK codebook and Low L1 priority HARQ-ACKs to be multiplexed into a Low L1 priority HARQ-ACK codebook. An example is shown in FIG. 7, where DCI #1, DCI #2, DCI #3 and DCI #4 schedule PDSCH #1, PDSCH #2, PDSCH #3 and PDSCH #4 respectively. DCI #1 and DCI #2 schedules a Low L1 priority PUCCH #1 in sub-slot m+8 which carries a Low L1 priority HARQ-ACK codebook to multiplex the HARQ-ACK feedbacks for PDSCH #1 and PDSCH #2. DCI #3 and DCI #4 schedules a High L1 priority PUCCH #2 in sub-slot m+9 which carries a High L1 priority HARQ-ACK codebook to multiplex the HARQ-ACK feedbacks for PDSCH #3 and PDSCH #4. Hence, this allows the gNB a mechanism to use different PUCCH that can have different reliability to carry HARQ-ACK with different L1 priorities.

In Rel-16 eURLLC, DCI Format 0_2 and 1_2 for UL Grant and DL Grant were introduced to allow for compact DCI size and new DCI fields. One of the features is the flexibility in configuring the sizes of most of the DCI fields. Hence for DCI Format 1_2, a 1 bit Counter DAI (C-DAI) field (without a T-DAI) is allowed to be configured, which enables a smaller DCI size. Since C-DAI is a wrap around counter, the UE will lose sync with the gNB if it misses two or more consecutive PDSCHs (i.e. fails to detect their DL Grants).

In Rel-16, when UCI carried by different L1 priority UL channels (e.g. PUCCH or PUSCH) collides, prioritisation is used where the UCI with the lower L1 priority is dropped and the UCI with the higher L1 priority is transmitted. Dropping a low L1 priority PUCCH containing multiple HARQ-ACK will lead to retransmissions of multiple PDSCH which is not an efficient use of resources. Hence, in Rel-17, multiplexing HARQ-ACKs of different L1 priorities are considered.

In Rel-16, separate HARQ-ACK codebooks are used for different L1 priorities and so each HARQ-ACK codebook maintains its own DAI. Therefore, when carrying out multiplexing of HARQ-ACKs of different L1 priorities, it would be necessary to find a way to manage the different DAIs for these different priority codebooks. Such an issue has not yet been addressed in the relevant art. Embodiments of the present technique propose solutions to such an issue.

DAI for Multiplexing of Different L1 Priority HARQ-ACKs

Figure 8:
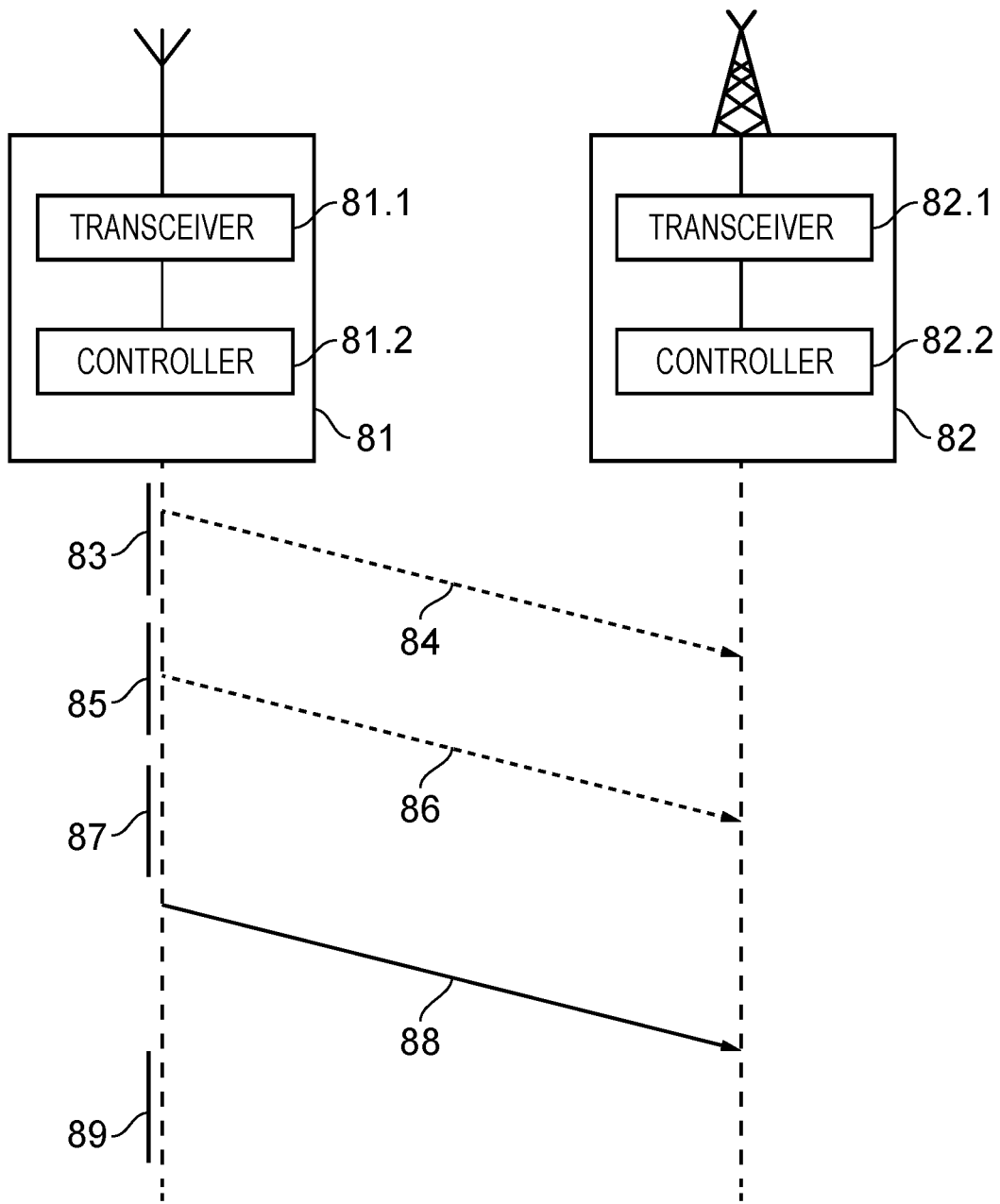
FIG. 8 shows a part schematic, part message flow diagram representation of a wireless communications network comprising a communications device and an infrastructure equipment in accordance with embodiments of the present technique.

FIG. 8 shows a part schematic, part message flow diagram representation of a wireless communications network comprising a communications device 81 and an infrastructure equipment 82 in accordance with at least some embodiments of the present technique. The communications device 81 is configured to transmit data to or receive data from the wireless communications network, for example, to and from the infrastructure equipment 82, via a wireless access interface provided by the wireless communications network. The communications device 81 and the infrastructure equipment 82 each comprise a transceiver (or transceiver circuitry) 81.1, 82.1, and a controller (or controller circuitry) 81.2, 82.2. Each of the controllers 81.2, 82.2 may be, for example, a microprocessor, a CPU, or a dedicated chipset, etc.

As shown in the example of FIG. 8, the transceiver circuitry 81.1 and the controller circuitry 81.2 of the communications device 81 are configured in combination, to determine 83, based on one or more first downlink control signals received from the wireless communications network (e.g. from the infrastructure equipment 82), that the communications device 81 is to transmit 84 a first uplink signal comprising a first set of feedback indications associated with a first priority level to the wireless communications network (e.g. to the infrastructure equipment 82) in a first set of uplink resources of a wireless access interface, the first set of feedback indications each indicating whether one of one or more first downlink data signals each scheduled by one of the first downlink control signals have been successfully received by the communications device 81, to determine 85, based on one or more second downlink control signals received from the wireless communications network (e.g. from the infrastructure equipment 82), that the communications device 81 is to transmit 86 a second uplink signal comprising a second set of feedback indications associated with a second priority level different to the first priority level to the wireless communications network (e.g. to the infrastructure equipment 82) in a second set of uplink resources of the wireless access interface, the second set of feedback indications each indicating whether one of one or more second downlink data signals each scheduled by one of the second downlink control signals have been successfully received by the communications device 81, to determine 87 that the first set of uplink resources and the second set of uplink resources are located within a same time slot or time sub-slot of the wireless access interface, to transmit 88 only the second uplink signal 86 to the wireless communications network (e.g. to the infrastructure equipment 82) instead of both of the first uplink signal 84 and the second uplink signal 86, the second uplink signal 86 comprising an indication of one or more of the first set of feedback indications, and to determine 89 that a downlink assignment index, DAI, associated with the first set of feedback indications is reduced (e.g. by the infrastructure equipment 82) when the one or more of the first set of feedback indications are indicated within the transmitted second uplink signal 88.

The DAI associated with the first set of feedback indications may be a counter DAI, C-DAI, the C-DAI being included within, and incremented by one for, each of the first downlink control signals. In addition, the communications device 81 may be configured to determine that a total DAI, T-DAI, associated with the first set of feedback indications is reduced (e.g. by the infrastructure equipment 82) when the one or more of the first set of feedback indications are indicated within the second uplink signal. Here, the T-DAI is included within each of the first downlink control signals, and indicates the number of scheduled first downlink data signals across two or more serving cells of the wireless communications network within a downlink occasion period (PDSCH occasion).

Essentially, embodiments of the present technique propose that Downlink Assignment Index (DAI) is allowed to decrease. It would be appreciated by those skilled in the art that in the prior art, the DAI is not assumed to decrease. This is so that the UE can keep track of the number of received PDSCH in case of missing DL Grants. It would be further appreciated by those skilled in the art that embodiments of the present technique are applicable to any dynamic HARQ-ACK codebook, i.e. Type 2 or enhanced Type 2, which utilizes DAI. A description of an enhanced Type 2 HARQ-ACK codebook may be found in co-pending European patent with application number EP20187799.0 [5].

In some arrangements of embodiments of the present technique, the C-DAI of a $1^{st}$ HARQ-ACK codebook of a $1^{st}$ L1 priority is decreased by the number of HARQ-ACKs being multiplexed into a $2^{nd}$ HARQ-ACK codebook of a $2^{nd}$ L1 priority. In other words, the DAI is reduced by the number of the one or more of the first set of feedback indications indicated within the second uplink signal. Those skilled in the art would appreciate here that either of a PUCCH or PUSCH can carry the HARQ-ACK codebook; thus the first and second uplink signals may each either be carried by a PUCCH or a PUSCH.

Figure 9:
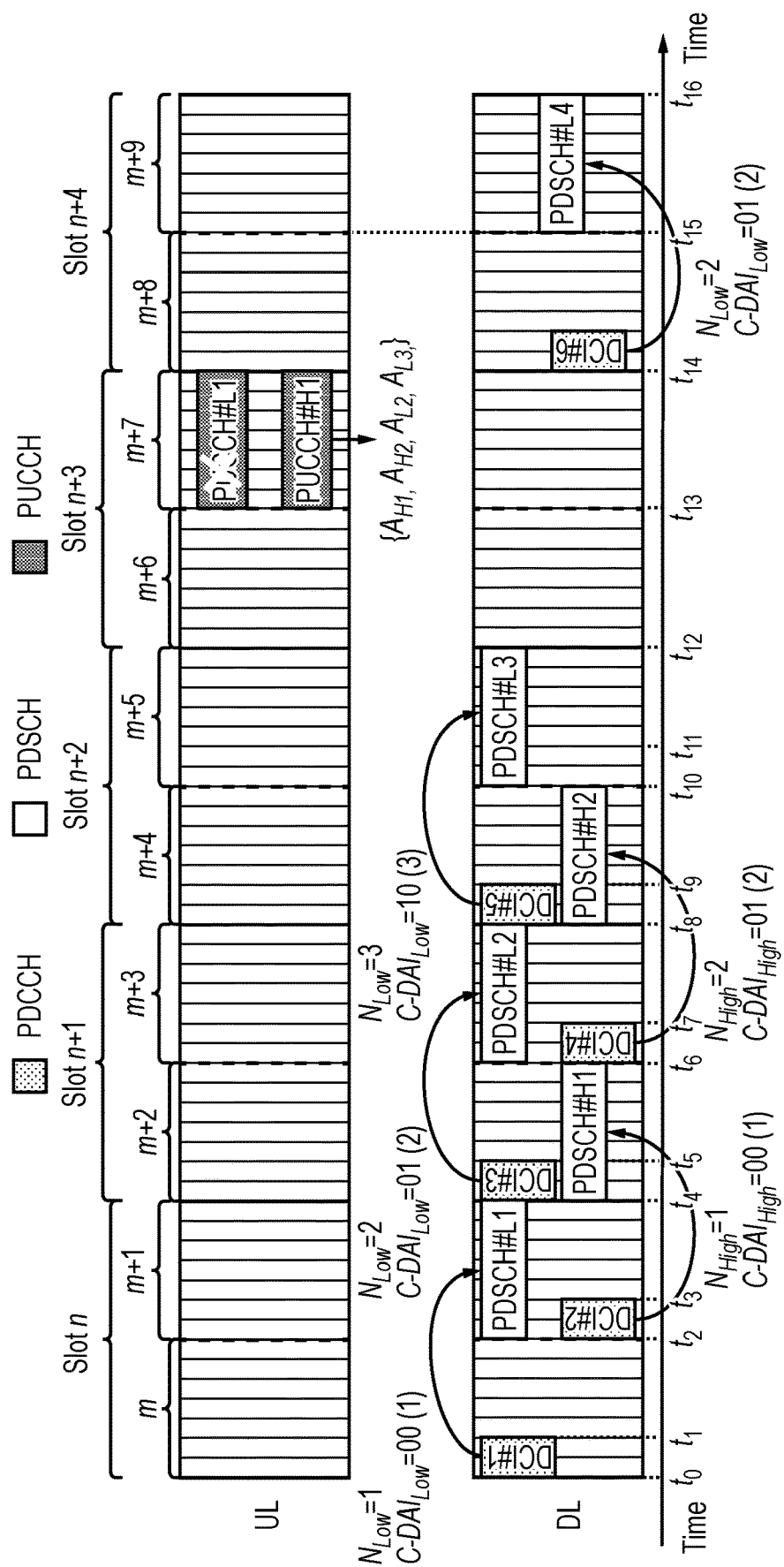
FIG. 9 illustrates an example of how a DAI may be decreased for a first HARQ-ACK codebook when its HARQ-ACKs are multiplexed into a second HARQ-ACK codebook in accordance with embodiments of the present technique.

An example is shown in FIG. 9, where DCI #1, DCI #3 and DCI #5 schedule PDSCH #L1 PDSCH #L2 and PDSCH #L3 respectively where their associated PUCCH #L1 has Low L1 priority. DCI #2 and DCI #4 schedule PDSCH #H1 and PDSCH #H2 respectively, where their associated PUCCH #H1 has High L1 priority. PUCCH #L1 and PUCCH #H1 collide in the same sub-slot and so here PUCCH #L1 is dropped. The most recent (i.e. latest) two HARQ-ACKs for PUCCH #L1 are multiplexed into PUCCH #H1; i.e. PUCCH #H1 carries HARQ-ACKs for PDSCH #H1, PDSCH #H2, PDSCH #L2 and PDSCH #L3. DCI #6 is transmitted after PUCCH #H1 and it schedules PDSCH #L4, where its HARQ-ACK is to be multiplexed into another Low L1 priority HARQ-ACK codebook. As per this arrangement, the C-DAI for the Low L1 priority is decreased by 2 since 2 of the HARQ-ACKs have been multiplexed into a High L1 priority HARQ-ACK codebook (i.e. PUCCH #H1).

In some arrangements of embodiments of the present technique, the C-DAI and the T-DAI (if configured) of a $1^{st}$ HARQ-ACK codebook of a $1^{st}$ L1 priority is reset (i.e. to zero) regardless of the number of HARQ-ACKs being multiplexed into a $2^{nd}$ HARQ-ACK codebook of a $2^{nd}$ L1 priority. In other words, the DAI is reduced to a value of zero.

In some arrangements of embodiments of the present technique, the C-DAI and the T-DAI (if configured) of a $1^{st}$ HARQ-ACK codebook of a $1^{st}$ L1 priority is reset (i.e. to zero) if the number of HARQ-ACKs being multiplexed into a $2^{nd}$ HARQ-ACK codebook of a $2^{nd}$ L1 priority exceeds a threshold $N_{Thres}$. In other words, the DAI is reduced to the value of zero if by the number of the one or more of the first set of feedback indications indicated within the second uplink signal is greater than a threshold number.

In some implementations of these arrangements, $N_{Thres}$=max value of the C-DAI bit; that is, if C-DAI is 2 bits, then $N_{Thres}$=4. In other words, the threshold number is equal to a maximum number possible for the DAI to indicate. These implementations recognise that if the C-DAI cannot keep track of more than four consecutive reductions or increases in HARQ-ACKs due to the wrap-around nature of the C-DAI field.

As described above, the HARQ-ACKs from the $1^{st}$ HARQ-ACK codebook may be multiplexed into the $2^{nd}$ HARQ-ACK codebook. In some arrangements of embodiments of the present disclosure, the number of HARQ-ACKs ($N_{HARQ}$) of a $1^{st}$ HARQ-ACK codebook that can be multiplexed into a $2^{nd}$ HARQ-ACK codebook of a different L1 priority may be specified or determined in some manner. At least some of the arrangements described below define how this may be achieved.

In some arrangements of embodiments of the present technique, all the HARQ-ACK from a $1^{st}$ HARQ-ACK codebook are multiplexed into the $2^{nd}$ HARQ-ACK codebook of a different L1 priority. In other words, all of the first set of feedback indications are multiplexed into the second uplink signal.

In some arrangements of embodiments of the present technique, $N_{HARQ}$=1. That is, only one of the HARQ-ACK from the $1^{st}$ HARQ-ACK codebook are multiplexed into the $2^{nd}$ HARQ-ACK codebook of a different L1 priority. In other words, only one of the first set of feedback indications is multiplexed into the second uplink signal.

In some arrangements of embodiments of the present technique where $N_{HARQ}$=1, when PUCCH resources for $1^{st}$ HARQ-ACK codebook and $2^{nd}$ HARQ-ACK codebook are different, the PUCCH resource used implicitly determines this HARQ-ACK of the $1^{st}$ HARQ-ACK codebook. In other words, only one of the first set of feedback indications is indicated within the second uplink signal, and wherein the one of the first set of feedback indications is indicated by which of the first set of uplink resources and the second set of uplink resources the second uplink signal is transmitted within. For example, if the HARQ-ACK of the $1^{st}$ HARQ-ACK codebook is "ACK", the PUCCH resource used to carry the $1^{st}$ HARQ-ACK codebook is used and if it is "NACK" the PUCCH resource used for the $2^{nd}$ HARQ-ACK codebook is used. Here, the PUCCH carries only the HARQ-ACK for the $2^{nd}$ HARQ-ACK codebook and the gNB would determine whether the HARQ-ACK for the $1^{st}$ HARQ-ACK codebook is a "ACK" or "NACK" based on the PUCCH resource used.

In some arrangements of embodiments of the present technique where $N_{HARQ}$=1, this HARQ-ACK is a bundled HARQ-ACK of all the HARQ-ACKs in the $1^{st}$ HARQ-ACK codebook. A bundled HARQ-ACK is such that it will send an "ACK" if all the HARQ-ACKs=ACK and "NACK" if any of the HARQ-ACKs are NACK. In other words, only one of the first set of feedback indications is indicated within the second uplink signal, and wherein the one of the first set of feedback indications indicates either that all of the first downlink control signals have been successfully received by the communications device or that at least one of the first downlink control signals has not been successfully received by the communications device. These arrangements recognise that in most cases (e.g. 90% of the time in eMBB), the PDSCH is correctly received and likely to send an "ACK" and HARQ-ACK resources would be saved by bundling these HARQ-ACKs into 1 HARQ-ACK.

In some arrangements of embodiments of the present technique, $N_{HARQ}$<Max C-DAI value. That is if C-DAI is 2 bits then $N_{HARQ}$<4. In other words, the number of the one or more of the first set of feedback indications indicated within the second uplink signal is less than or equal to a maximum number possible for the DAI to indicate. These arrangements recognise that if the reduction in C-DAI is greater than 4, the UE may lose alignment with the number of DAIs due to the wrap around nature of the C-DAI field.

In some arrangements of embodiments of the present technique, the gNB indicates in a DCI the number of HARQ-ACK $N_{HARQ}$, in a $1^{st}$ HARQ-ACK codebook that can be multiplexed into a $2^{nd}$ HARQ-ACK codebook of a different L1 priority. In other words, the communications device is configured to receive, from the wireless communications network, an indication of the number of the one or more of the first set of feedback indications that are to be indicated within the second uplink signal. The following bullet points describe some implementations of these arrangements.

$N_{HARQ}$ is indicated in the DL Grant scheduling the PUCCH for the $1^{st}$ HARQ-ACK codebook, where its HARQ-ACKs are multiplexed into a $2^{nd}$ HARQ-ACK codebook. For example, the DL Grant of the Low L1 priority PUCCH indicates the number of HARQ-ACKs that can be multiplexed into a High L1 priority PUCCH that collides in the same slot or sub-slot. It should be noted that, here, "collide in a slot or sub-slot" does not necessarily mean the PUCCHs overlap in time, but rather that multiplexing is performed when two HARQ-ACK PUCCHs reside in the same slot or sub-slot;

$N_{HARQ}$ is indicated in the DL Grant scheduling the PUCCH for the $2^{nd}$ HARQ-ACK codebook, where the HARQ-ACK from the $1^{st}$ HARQ-ACK codebooks will be multiplexed into this $2^{nd}$ HARQ-ACK codebook For example, the $2^{nd}$ HARQ-ACK codebook can be of High L1 priority and the DL Grant scheduling its PUCCH tells the UE the number of HARQ-ACK in a Low L1 priority HARQ-ACK codebook that can be multiplexed into; and $N_{HARQ}$ is indicated in each DL Grant scheduling the PDSCHs. This can be viewed as a new "Multiplexing DAP" (M-DAI). This is to avoid the UE missing the DL Grant with the $N_{HARQ}$ value.

In other words, in these implementations of such arrangements of embodiments of the present technique, one or both of the first downlink control signals and the second downlink control signals each comprise the indication of the number of the one or more of the first set of feedback indications that are to be indicated within the second uplink signal.

In some arrangements of embodiments of the present technique, $N_{HARQ}$ is RRC configured. In other words, the indication of the number of the one or more of the first set of feedback indications that are to be indicated within the second uplink signal is received via radio resource control, RRC, signalling.

In some arrangements of embodiments of the present technique, $N_{HARQ}$ is fixed in the specifications. In other words, the number of the one or more of the first set of feedback indications that are to be indicated within the second uplink signal is predetermined and known to the communications device.

In some arrangements of embodiments of the present technique, $N_{HARQ}$ consists of the last $N_{HARQ}$ HARQ-ACKs. In other words, the one or more of the first set of feedback indications indicated within the second uplink signal are associated with the one or more of the first downlink control signals which are scheduled latest in time. Using the example shown in FIG. 9, if $N_{HARQ}=2$, then the HARQ-ACKs that are multiplexed from the Low L1 HARQ-ACK codebook are for PDSCH #L2 & PDSCH #L3.

In some arrangements of embodiments of the present technique, $N_{HARQ}$ consists of the earliest $N_{HARQ}$ HARQ-ACKs. In other words, the one or more of the first set of feedback indications indicated within the second uplink signal are associated with the one or more of the first downlink control signals which are scheduled earliest in time. Using the example shown in FIG. 9, if $N_{HARQ}=2$, then the HARQ-ACKs that are multiplexed from the Low L1 HARQ-ACK codebook are for PDSCH #L1 & PDSCH #L2.

In accordance with embodiments of the present technique, it is the L1 priorities of the $1^{st}$ and $2^{nd}$ HARQ-ACK codebooks which is used to determine which codebook should comprise the multiplexed HARQ-ACKs from the other codebook (or should otherwise indicate these HARQ-ACKs). In other words, the communications device is configured to determine that the communications device is to transmit only the second uplink signal to the wireless communications network instead of both of the first uplink signal and the second uplink signal dependent on a determined preference between the first priority level and the second priority level.

It is expected that the PUCCH or PUSCH that carries the Low L1 priority HARQ-ACK codebook will be dropped and the PUCCH or PUSCH of the High L1 priority HARQ-ACK codebook will carry the multiplexed HARQ-ACKs. It is also expected that all High L1 priority HARQ-ACK are always transmitted, and thus that Low L1 priority HARQ-ACKs are multiplexed into or otherwise indicated by the High L1 priority HARQ-ACK codebook. However, in accordance with embodiments of the present disclosure, it may alternatively be the Lower L1 priority PUCCH/PUSCH carrying the HARQ-ACK code which carries the multiplexed HARQ-ACKs of both L1 priority HARQ-ACKs. That is, the determined preference between the first priority level and the second priority level may be that the higher of the first priority level and the second priority level is preferred, or that the lower of the first priority level and the second priority level is preferred.

In some arrangements of embodiments of the present technique, whether the $1^{st}$ HARQ-ACK codebook or the $2^{nd}$ HARQ-ACK codebook is used for multiplexing is fixed in the specifications. In other words, the preference between the first priority level and the second priority level is predetermined and known to the communications device.

In some arrangements of embodiments of the present technique, whether the $1^{st}$ HARQ-ACK codebook or the $2^{nd}$ HARQ-ACK codebook is used for multiplexing is RRC configured. That is, the gNB can configured the UE to always drop the Low L1 priority HARQ-ACK codebook and multiplex into the High L1 priority HARQ-ACK codebook (or vice-versa). In other words, the preference between the first priority level and the second priority level is indicated to the communications device by RRC signalling received from the wireless communications network.

In some arrangements of embodiments of the present technique, whether the $1^{st}$ HARQ-ACK codebook or the $2^{nd}$ HARQ-ACK codebook is used for multiplexing is explicitly indicated by the gNB using a DCI. In other words, the preference between the first priority level and the second priority level is indicated to the communications device by a downlink control information, DCI, signalling message received from the wireless communications network.

Here, a new DCI field may be introduced, e.g. 1 bit in the DL Grant, to indicate either the Low L1 priority or High L1 priority codebook that will be carry the multiplexed HARQ-ACKs. In other words, the indication of the preference between the first priority level and the second priority level is explicitly included within a dedicated field of the DCI signalling message.

Alternatively, the DCI indication of whether the $1^{st}$ HARQ-ACK codebook or the $2^{nd}$ HARQ-ACK codebook is used for multiplexing may be based on the legacy Rel-16 L1 priority indicator in the DCI field "Priority indicator" and another parameter. In other words, the indication of the preference between the first priority level and the second priority level is an implicit indication based on both of a first field of the DCI signalling message and a second field of the DCI signalling message, wherein the first field is a priority indicator field. Here, the other parameter may be a DCI indicator (as per the above described arrangements) indicating the number of HARQ-ACKs that will be multiplexed into the other HARQ-ACK codebook. For example if this field is non-zero, and the "Priority indicator"=1, then the High L1 priority codebook will carry the multiplexed HARQ-ACKs.

In some implementations of these arrangements, if multiple DCIs to indicate whether the $1^{st}$ HARQ-ACK codebook or the $2^{nd}$ HARQ-ACK codebook is used for multiplexing indicate different indication, UE follows the indication transmitted by the latest DCI. In other words, the DCI signalling message is a most recently received DCI signalling message which comprises an indication of the preference between the first priority level and the second priority level. In some implementations of these arrangements, UE is not expected that multiple DCIs to indicate whether the $1^{st}$ HARQ-ACK codebook or the $2^{nd}$ HARQ-ACK codebook is used for multiplexing indicate different indication.

In some arrangements of embodiments of the present technique, whether the $1^{st}$ HARQ-ACK codebook or the $2^{nd}$ HARQ-ACK codebook is used for multiplexing is the PUCCH with the larger resource. In other words, the communications device is configured to determine that the communications device is to transmit only the second uplink signal to the wireless communications network instead of both of the first uplink signal and the second uplink signal dependent on which of the first set of uplink resources or the second set of uplink resources is larger. Here a PUCCH with more resources can be either of a longer PUCCH or one with a larger number of PRBs, which allow more HARQ-ACKs to be carried at a better reliability.

Flow Chart Representation

Figure 10:
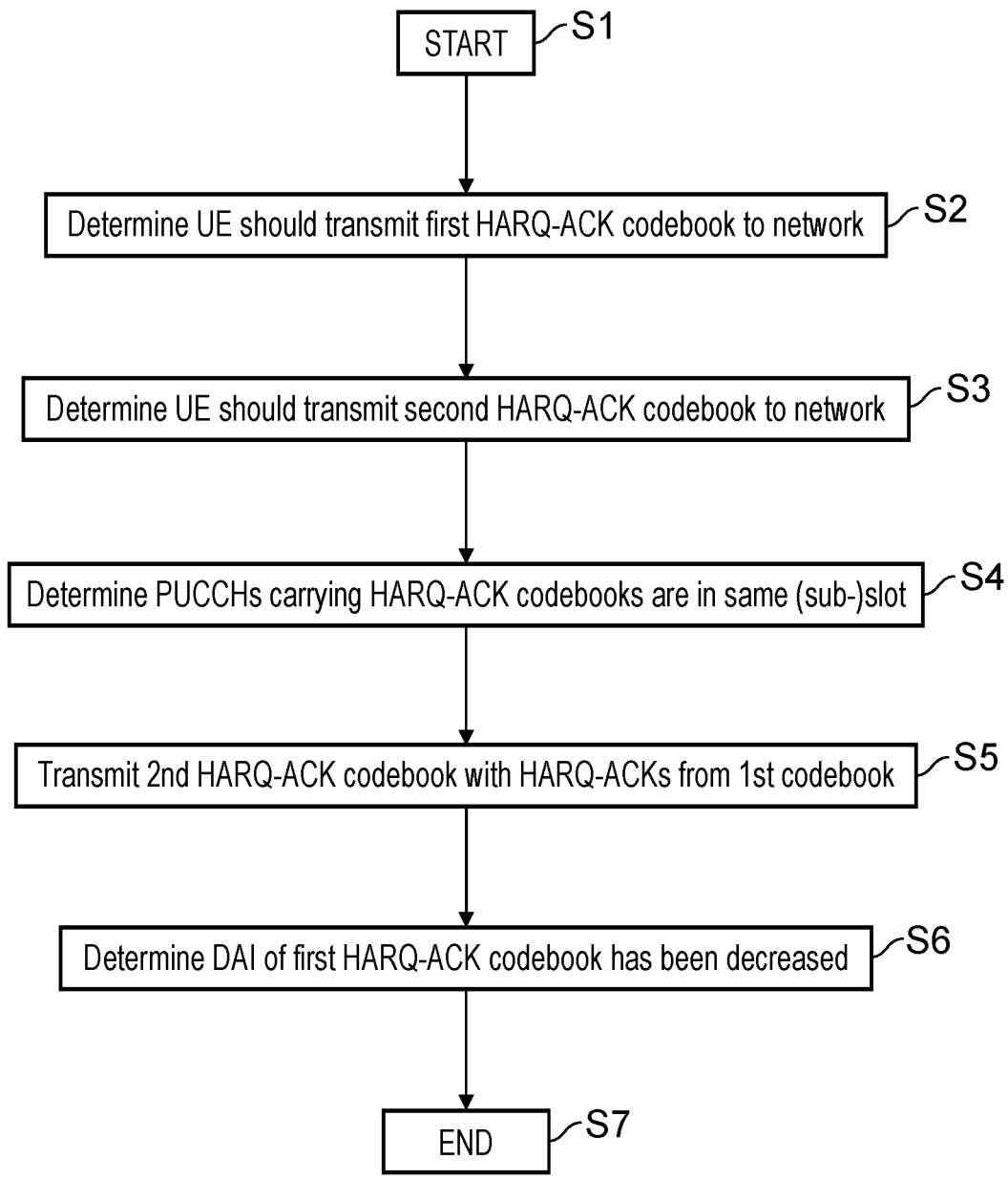
FIG. 10 shows a flow diagram illustrating a process of communications in a communications system in accordance with embodiments of the present technique.

FIG. 10 shows a flow diagram illustrating an example process of communications in a communications system in accordance with embodiments of the present technique. The process shown by FIG. 10 is a method of operating a communications device (which may be configured to transmit data to or receive data from an infrastructure equipment) in a wireless communications network.

The method begins in step S1. The method comprises, in step S2, determining, based on one or more first downlink control signals received from the wireless communications network, that the communications device is to transmit a first uplink signal comprising a first set of feedback indications associated with a first priority level to the wireless communications network in a first set of uplink resources of a wireless access interface, the first set of feedback indications each indicating whether one of one or more first downlink data signals each scheduled by one of the first downlink control signals have been successfully received by the communications device. The process then moves to step S3, which involves determining, based on one or more second downlink control signals received from the wireless communications network, that the communications device is to transmit a second uplink signal comprising a second set of feedback indications associated with a second priority level different to the first priority level to the wireless communications network in a second set of uplink resources of the wireless access interface, the second set of feedback indications each indicating whether one of one or more second downlink data signals each scheduled by one of the second downlink control signals have been successfully received by the communications device. Next, in step S4, the method comprises determining that the first set of uplink resources and the second set of uplink resources are located within a same time slot or time sub-slot of the wireless access interface. The process then comprises, in step S5, transmitting only the second uplink signal to the wireless communications network instead of both of the first uplink signal and the second uplink signal, the second uplink signal comprising an indication of one or more of the first set of feedback indications, and then in step S6, determining that a downlink assignment index, DAI, associated with the first set of feedback indications is reduced when the one or more of the first set of feedback indications are indicated within the second uplink signal. The method ends in step S7.

Those skilled in the art would appreciate that the method shown by FIG. 10 may be adapted in accordance with embodiments of the present technique. For example, other intermediate steps may be included in the method, or the steps may be performed in any logical order.

Though embodiments of the present technique have been described largely by way of the example communications system shown in FIG. 8, it would be clear to those skilled in the art that they could be equally applied to other systems to those described herein.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered paragraphs provide further example aspects and features of the present technique:

Paragraph 1. A method of operating a communications device in a wireless communications network, the method comprising determining, based on one or more first downlink control signals received from the wireless communications network, that the communications device is to transmit a first uplink signal comprising a first set of feedback indications associated with a first priority level to the wireless communications network in a first set of uplink resources of a wireless access interface, the first set of feedback indications each indicating whether one of one or more first downlink data signals each scheduled by one of the first downlink control signals have been successfully received by the communications device, determining, based on one or more second downlink control signals received from the wireless communications network, that the communications device is to transmit a second uplink signal comprising a second set of feedback indications associated with a second priority level different to the first priority level to the wireless communications network in a second set of uplink resources of the wireless access interface, the second set of feedback indications each indicating whether one of one or more second downlink data signals each scheduled by one of the second downlink control signals have been successfully received by the communications device, determining that the first set of uplink resources and the second set of uplink resources are located within a same time slot or time sub-slot of the wireless access interface, transmitting only the second uplink signal to the wireless communications network instead of both of the first uplink signal and the second uplink signal, the second uplink signal comprising an indication of one or more of the first set of feedback indications, and determining that a downlink assignment index, DAI, associated with the first set of feedback indications is reduced when the one or more of the first set of feedback indications are indicated within the second uplink signal.

Paragraph 2. A method according to Paragraph 1, wherein the DAI is a counter DAI, C-DAI, the C-DAI being included within, and incremented by one for, each of the first downlink control signals.

Paragraph 3. A method according to Paragraph 2, comprising
determining that a total DAI, T-DAI, associated with the first set of feedback indications is reduced when the one or more of the first set of feedback indications are indicated within the second uplink signal,
wherein the T-DAI is included within each of the first downlink control signals, and indicates the number of first downlink data signals scheduled across two or more serving cells of the wireless communications network within a downlink occasion period.

Paragraph 4. A method according to any of Paragraphs 1 to 3, wherein the DAI is reduced by the number of the one or more of the first set of feedback indications indicated within the second uplink signal.

Paragraph 5. A method according to any of Paragraphs 1 to 4, wherein the DAI is reduced to a value of zero.

Paragraph 6. A method according to Paragraph 5, wherein the DAI is reduced to the value of zero if by the number of the one or more of the first set of feedback indications indicated within the second uplink signal is greater than a threshold number.

Paragraph 7. A method according to Paragraph 6, wherein the threshold number is equal to a maximum number possible for the DAI to indicate.

Paragraph 8. A method according to any of Paragraphs 1 to 7, comprising
multiplexing the one or more the first set of feedback indications into the second uplink signal.

Paragraph 9. A method according to Paragraph 8, wherein all of the first set of feedback indications are multiplexed into the second uplink signal.

Paragraph 10. A method according to Paragraph 8 or Paragraph 9, wherein only one of the first set of feedback indications is multiplexed into the second uplink signal.

Paragraph 11. A method according to any of Paragraphs 1 to 10, wherein only one of the first set of feedback indications is indicated within the second uplink signal, and wherein the one of the first set of feedback indications is indicated by which of the first set of uplink resources and the second set of uplink resources the second uplink signal is transmitted within.

Paragraph 12. A method according to any of Paragraphs 1 to 11, wherein only one of the first set of feedback indications is indicated within the second uplink signal, and wherein the one of the first set of feedback indications indicates either that all of the first downlink control signals have been successfully received by the communications device or that at least one of the first downlink control signals has not been successfully received by the communications device.

Paragraph 13. A method according to any of Paragraphs 1 to 12, wherein the number of the one or more of the first set of feedback indications indicated within the second uplink signal is less than or equal to a maximum number possible for the DAI to indicate.

Paragraph 14. A method according to any of Paragraphs 1 to 13, comprising
receiving, from the wireless communications network, an indication of the number of the one or more of the first set of feedback indications that are to be indicated within the second uplink signal.

Paragraph 15. A method according to Paragraph 14, wherein one or both of the first downlink control signals and the second downlink control signals each comprise the indication of the number of the one or more of the first set of feedback indications that are to be indicated within the second uplink signal.

Paragraph 16. A method according to Paragraph 14 or Paragraph 15, wherein the indication of the number of the one or more of the first set of feedback indications that are to be indicated within the second uplink signal is received via radio resource control, RRC, signalling.

Paragraph 17. A method according to any of Paragraphs 1 to 16, wherein the number of the one or more of the first set of feedback indications that are to be indicated within the second uplink signal is predetermined and known to the communications device.

Paragraph 18. A method according to any of Paragraphs 1 to 17, wherein the one or more of the first set of feedback indications indicated within the second uplink signal are associated with the one or more of the first downlink control signals which are scheduled latest in time.

Paragraph 19. A method according to any of Paragraphs 1 to 18, wherein the one or more of the first set of feedback indications indicated within the second uplink signal are associated with the one or more of the first downlink control signals which are scheduled earliest in time.

Paragraph 20. A method according to any of Paragraphs 1 to 19, comprising
determining that the communications device is to transmit only the second uplink signal to the wireless communications network instead of both of the first uplink signal and the second uplink signal dependent on a determined preference between the first priority level and the second priority level.

Paragraph 21. A method according to Paragraph 20, wherein the preference between the first priority level and the second priority level is predetermined and known to the communications device.

Paragraph 22. A method according to Paragraph 21, wherein the predetermined priority level is the higher priority level between the first priority level and the second priority level.

Paragraph 23. A method according to any of Paragraphs 20 to 22, wherein the preference between the first priority level and the second priority level is indicated to the communications device by RRC signalling received from the wireless communications network.

Paragraph 24. A method according to any of Paragraphs 20 to 23, wherein the preference between the first priority level and the second priority level is indicated to the communications device by a downlink control information, DCI, signalling message received from the wireless communications network.

Paragraph 25. A method according to Paragraph 24, wherein the DCI signalling message is a most recently received DCI signalling message which comprises an indication of the preference between the first priority level and the second priority level.

Paragraph 26. A method according to Paragraph 24 or Paragraph 25, wherein the indication of the preference between the first priority level and the second priority level is explicitly included within a dedicated field of the DCI signalling message.

Paragraph 27. A method according to any of Paragraphs 24 to 26, wherein the indication of the preference between the first priority level and the second priority level is an implicit indication based on both of a first field of the DCI signalling message and a second field of the DCI signalling message, wherein the first field is a priority indicator field.

Paragraph 28. A method according to any of Paragraphs 1 to 27, comprising
determining that the communications device is to transmit only the second uplink signal to the wireless communications network instead of both of the first uplink signal and the second uplink signal dependent on which of the first set of uplink resources or the second set of uplink resources is larger.

Paragraph 29. A communications device suitable for use in a wireless communications network, the communications device comprising
transceiver circuitry configured to transmit signals and receive signals via a wireless access interface, and
controller circuitry configured in combination with the transceiver circuitry
to determine, based on one or more first downlink control signals received from the wireless communications network, that the communications device is to transmit a first uplink signal comprising a first set of feedback indications associated with a first priority level to the wireless communications network in a first set of uplink resources of a wireless access interface, the first set of feedback indications each indicating whether one of one or more first downlink data signals each scheduled by one of the first downlink control signals have been successfully received by the communications device,
to determine, based on one or more second downlink control signals received from the wireless communications network, that the communications device is to transmit a second uplink signal comprising a second set of feedback indications associated with a second priority level different to the first priority level to the wireless communications network in a second set of uplink resources of the wireless access interface, the second set of feedback indications each indicating whether one of one or more second downlink data signals each scheduled by one of the second downlink control signals have been successfully received by the communications device,
to determine that the first set of uplink resources and the second set of uplink resources are located within a same time slot or time sub-slot of the wireless access interface,
to transmit only the second uplink signal to the wireless communications network instead of both of the first uplink signal and the second uplink signal, the second uplink signal comprising an indication of one or more of the first set of feedback indications, and
to determine that a downlink assignment index, DAI, associated with the first set of feedback indications is reduced when the one or more of the first set of feedback indications are indicated within the second uplink signal.

Paragraph 30. Circuitry for a communications device suitable for use in a wireless communications network, the circuitry comprising
transceiver circuitry configured to transmit signals and receive signals via a wireless access interface, and
controller circuitry configured in combination with the transceiver circuitry
to determine, based on one or more first downlink control signals received from the wireless communications network, that the circuitry is to transmit a first uplink signal comprising a first set of feedback indications associated with a first priority level to the wireless communications network in a first set of uplink resources of a wireless access interface, the first set of feedback indications each indicating whether one of one or more first downlink data signals each scheduled by one of the first downlink control signals have been successfully received by the circuitry,
to determine, based on one or more second downlink control signals received from the wireless communications network, that the circuitry is to transmit a second uplink signal comprising a second set of feedback indications associated with a second priority level different to the first priority level to the wireless communications network in a second set of uplink resources of the wireless access interface, the second set of feedback indications each indicating whether one of one or more second downlink data signals each scheduled by one of the second downlink control signals have been successfully received by the circuitry,
to determine that the first set of uplink resources and the second set of uplink resources are located within a same time slot or time sub-slot of the wireless access interface,
to transmit only the second uplink signal to the wireless communications network instead of both of the first uplink signal and the second uplink signal, the second uplink signal comprising an indication of one or more of the first set of feedback indications, and
to determine that a downlink assignment index, DAI, associated with the first set of feedback indications is reduced when the one or more of the first set of feedback indications are indicated within the second uplink signal.

Paragraph 31. A method of operating an infrastructure equipment forming part of a wireless communications network, the method comprising
determining, based on one or more first downlink control signals transmitted to a communications device by the infrastructure equipment, that the infrastructure equipment is to receive a first uplink signal comprising a first set of feedback indications associated with a first priority level from the communications device in a first set of uplink resources of a wireless access interface, the first set of feedback indications each indicating whether one of one or more first downlink data signals each scheduled by one of the first downlink control signals and transmitted by the infrastructure equipment have been successfully received by the communications device,
determining, based on one or more second downlink control signals transmitted to the communications device by the infrastructure equipment, that the infrastructure equipment is to receive a second uplink signal comprising a second set of feedback indications associated with a second priority level different to the first priority level from the communications device in a second set of uplink resources of the wireless access interface, the second set of feedback indications each indicating whether one of one or more second downlink data signals each scheduled by one of the second downlink control signals and transmitted by the infrastructure equipment have been successfully received by the communications device, receiving only the second uplink signal from the communications device instead of both of the first uplink signal and the second uplink signal, the second uplink signal comprising an indication of one or more of the first set of feedback indications, and reducing a downlink assignment index, DAI, associated with the first set of feedback indications in response to receiving the second uplink signal comprising the indication of the one or more of the first set of feedback indications.

Paragraph 32. A method according to Paragraph 31, wherein the DAI is a counter DAI, C-DAI, the C-DAI being included within, and incremented by one for, each of the first downlink control signals.

Paragraph 33. A method according to Paragraph 32, comprising reducing a total DAI, T-DAI, associated with the first set of feedback indications in response to receiving the second uplink signal comprising the indication of the one or more of the first set of feedback indications, wherein the T-DAI is included within each of the first downlink control signals, and indicates the number of first downlink data signals scheduled across two or more serving cells of the wireless communications network within a downlink occasion period.

Paragraph 34. A method according to any of Paragraphs 31 to 33, comprising reducing the DAI by the number of the one or more of the first set of feedback indications indicated within the second uplink signal.

Paragraph 35. A method according to any of Paragraphs 31 to 34, comprising reducing the DAI to a value of zero.

Paragraph 36. A method according to Paragraph 35, comprising reducing the DAI to the value of zero if by the number of the one or more of the first set of feedback indications indicated within the second uplink signal is greater than a threshold number.

Paragraph 37. A method according to Paragraph 36, wherein the threshold number is equal to a maximum number possible for the DAI to indicate.

Paragraph 38. A method according to any of Paragraphs 31 to 37, wherein the one or more the first set of feedback indications are multiplexed into the second uplink signal.

Paragraph 39. A method according to Paragraph 38, wherein all of the first set of feedback indications are multiplexed into the second uplink signal.

Paragraph 40. A method according to Paragraph 38 or Paragraph 39, wherein only one of the first set of feedback indications is multiplexed into the second uplink signal.

Paragraph 41. A method according to any of Paragraphs 31 to 40, wherein only one of the first set of feedback indications is indicated within the second uplink signal, the method comprising determining the one of the first set of feedback indications based on which of the first set of uplink resources and the second set of uplink resources the second uplink signal is transmitted within.

Paragraph 42. A method according to any of Paragraphs 31 to 41, wherein only one of the first set of feedback indications is indicated within the second uplink signal, the method comprising determining that the one of the first set of feedback indications indicates either that all of the first downlink control signals have been successfully received by the communications device or that at least one of the first downlink control signals has not been successfully received by the communications device.

Paragraph 43. A method according to any of Paragraphs 31 to 42, wherein the number of the one or more of the first set of feedback indications indicated within the second uplink signal is less than or equal to a maximum number possible for the DAI to indicate.

Paragraph 44. A method according to any of Paragraphs 31 to 43, comprising transmitting, to the communications device, an indication of the number of the one or more of the first set of feedback indications that are to be indicated within the second uplink signal.

Paragraph 45. A method according to Paragraph 44, wherein one or both of the first downlink control signals and the second downlink control signals each comprise the indication of the number of the one or more of the first set of feedback indications that are to be indicated within the second uplink signal.

Paragraph 46. A method according to Paragraph 44 or Paragraph 45, wherein the indication of the number of the one or more of the first set of feedback indications that are to be indicated within the second uplink signal is transmitted via radio resource control, RRC, signalling.

Paragraph 47. A method according to any of Paragraphs 31 to 46, wherein the one or more of the first set of feedback indications indicated within the second uplink signal are associated with the one or more of the first downlink control signals which are scheduled latest in time.

Paragraph 48. A method according to any of Paragraphs 31 to 47, wherein the one or more of the first set of feedback indications indicated within the second uplink signal are associated with the one or more of the first downlink control signals which are scheduled earliest in time.

Paragraph 49. A method according to any of Paragraphs 31 to 48, comprising receiving only the second uplink signal from the communications device instead of both of the first uplink signal and the second uplink signal dependent on a determined preference between the first priority level and the second priority level.

Paragraph 50 A method according to Paragraph 49, wherein the preference between the first priority level and the second priority level is indicated to the communications device by RRC signalling transmitted by the wireless communications network.

Paragraph 51. A method according to Paragraph 49 or Paragraph 50, wherein the preference between the first priority level and the second priority level is indicated to the communications device by a downlink control information, DCI, signalling message transmitted by the infrastructure equipment.

Paragraph 52. A method according to Paragraph 51, wherein the DCI signalling message is a most recently transmitted DCI signalling message which comprises an indication of the preference between the first priority level and the second priority level.

Paragraph 53. A method according to Paragraph 51 or Paragraph 52, wherein the indication of the preference between the first priority level and the second priority level is explicitly included within a dedicated field of the DCI signalling message.

Paragraph 54. A method according to any of Paragraphs 51 to 53, wherein the indication of the preference between the first priority level and the second priority level is an implicit indication based on both of a first field of the DCI signalling message and a second field of the DCI signalling message, wherein the first field is a priority indicator field.

Paragraph 55. A method according to any of Paragraphs 31 to 54, comprising
receiving only the second uplink signal from the communications device instead of both of the first uplink signal and the second uplink signal dependent on which of the first set of uplink resources or the second set of uplink resources is larger.

Paragraph 56. An infrastructure equipment forming part of a wireless communications network, the infrastructure equipment comprising
transceiver circuitry configured to transmit signals and receive signals via a wireless access interface provided by the infrastructure equipment, and
controller circuitry configured in combination with the transceiver circuitry
to determine, based on one or more first downlink control signals transmitted to a communications device by the infrastructure equipment, that the infrastructure equipment is to receive a first uplink signal comprising a first set of feedback indications associated with a first priority level from the communications device in a first set of uplink resources of a wireless access interface, the first set of feedback indications each indicating whether one of one or more first downlink data signals each scheduled by one of the first downlink control signals and transmitted by the infrastructure equipment have been successfully received by the communications device,
to determine, based on one or more second downlink control signals transmitted to the communications device by the infrastructure equipment, that the infrastructure equipment is to receive a second uplink signal comprising a second set of feedback indications associated with a second priority level different to the first priority level from the communications device in a second set of uplink resources of the wireless access interface, the second set of feedback indications each indicating whether one of one or more second downlink data signals each scheduled by one of the second downlink control signals and transmitted by the infrastructure equipment have been successfully received by the communications device,
to receive only the second uplink signal from the communications device instead of both of the first uplink signal and the second uplink signal, the second uplink signal comprising an indication of one or more of the first set of feedback indications, and
to reduce a downlink assignment index, DAI, associated with the first set of feedback indications in response to receiving the second uplink signal comprising the indication of the one or more of the first set of feedback indications.

Paragraph 57. Circuitry for an infrastructure equipment forming part of a wireless communications network, the circuitry comprising
transceiver circuitry configured to transmit signals and receive signals via a wireless access interface provided by the circuitry, and
controller circuitry configured in combination with the transceiver circuitry
to determine, based on one or more first downlink control signals transmitted to a communications device by the circuitry, that the circuitry is to receive a first uplink signal comprising a first set of feedback indications associated with a first priority level from the communications device in a first set of uplink resources of a wireless access interface, the first set of feedback indications each indicating whether one of one or more first downlink data signals each scheduled by one of the first downlink control signals and transmitted by the circuitry have been successfully received by the communications device,
to determine, based on one or more second downlink control signals transmitted to the communications device by the circuitry, that the circuitry is to receive a second uplink signal comprising a second set of feedback indications associated with a second priority level different to the first priority level from the communications device in a second set of uplink resources of the wireless access interface, the second set of feedback indications each indicating whether one of one or more second downlink data signals each scheduled by one of the second downlink control signals and transmitted by the circuitry have been successfully received by the communications device,
to receive only the second uplink signal from the communications device instead of both of the first uplink signal and the second uplink signal, the second uplink signal comprising an indication of one or more of the first set of feedback indications, and
to reduce a downlink assignment index, DAI, associated with the first set of feedback indications in response to receiving the second uplink signal comprising the indication of the one or more of the first set of feedback indications.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] Holma H. and Toskala A, "LTE for UMTS OFDMA and SC-FDMA based radio access", John Wiley and Sons, 2009.
[2] TR 38.913, "Study on Scenarios and Requirements for Next Generation Access Technologies (Release 14)", $3^{rd}$ Generation Partnership Project, v14.3.0.
[3] RP-190726, "Physical layer enhancements for NR ultra-reliable and low latency communication (URLLC)", Huawei, HiSilicon, RAN #83.

[4] RP-201310, "Revised WID: Enhanced Industrial Internet of Things (IoT) and ultra-reliable and low latency communication (URLLC) support for NR," Nokia, Nokia Shanghai Bell, RAN #88e.
[5] European patent application number EP20187799.0.

What is claimed is:

1. A method of operating a communications device in a wireless communications network, the method comprising
determining, based on one or more first downlink control signals received from the wireless communications network, that the communications device is to transmit a first uplink signal comprising a first set of feedback indications associated with a first priority level to the wireless communications network in a first set of uplink resources of a wireless access interface, the first set of feedback indications each indicating whether one of one or more first downlink data signals each scheduled by one of the first downlink control signals have been successfully received by the communications device,
determining, based on one or more second downlink control signals received from the wireless communications network, that the communications device is to transmit a second uplink signal comprising a second set of feedback indications associated with a second priority level different to the first priority level to the wireless communications network in a second set of uplink resources of the wireless access interface, the second set of feedback indications each indicating whether one of one or more second downlink data signals each scheduled by one of the second downlink control signals have been successfully received by the communications device,
determining that the first set of uplink resources and the second set of uplink resources are located within a same time slot or time sub-slot of the wireless access interface,
transmitting only the second uplink signal to the wireless communications network instead of both of the first uplink signal and the second uplink signal, the second uplink signal comprising an indication of one or more of the first set of feedback indications, and
determining that a downlink assignment index, DAI, associated with the first set of feedback indications is reduced when the one or more of the first set of feedback indications are indicated within the second uplink signal.

2. A method according to claim 1, wherein the DAI is a counter DAI, C-DAI, the C-DAI being included within, and incremented by one for, each of the first downlink control signals.

3. A method according to claim 2, comprising
determining that a total DAI, T-DAI, associated with the first set of feedback indications is reduced when the one or more of the first set of feedback indications are indicated within the second uplink signal,
wherein the T-DAI is included within each of the first downlink control signals, and indicates the number of first downlink data signals scheduled across two or more serving cells of the wireless communications network within a downlink occasion period.

4. A method according to claim 1, wherein the DAI is reduced by the number of the one or more of the first set of feedback indications indicated within the second uplink signal.

5. A method according to claim 1, wherein the DAI is reduced to a value of zero.

6. A method according to claim 5, wherein the DAI is reduced to the value of zero if by the number of the one or more of the first set of feedback indications indicated within the second uplink signal is greater than a threshold number.

7. A method according to claim 6, wherein the threshold number is equal to a maximum number possible for the DAI to indicate.

8. A method according to claim 1, comprising
multiplexing the one or more the first set of feedback indications into the second uplink signal.

9. A method according to claim 8, wherein all of the first set of feedback indications are multiplexed into the second uplink signal.

10. A method according to claim 8, wherein only one of the first set of feedback indications is multiplexed into the second uplink signal.

11. A method according to claim 1, wherein only one of the first set of feedback indications is indicated within the second uplink signal, and wherein the one of the first set of feedback indications is indicated by which of the first set of uplink resources and the second set of uplink resources the second uplink signal is transmitted within.

12. A method according to claim 1, wherein only one of the first set of feedback indications is indicated within the second uplink signal, and wherein the one of the first set of feedback indications indicates either that all of the first downlink control signals have been successfully received by the communications device or that at least one of the first downlink control signals has not been successfully received by the communications device.

13. A method according to claim 1, wherein the number of the one or more of the first set of feedback indications indicated within the second uplink signal is less than or equal to a maximum number possible for the DAI to indicate.

14. A method according to claim 1, comprising
receiving, from the wireless communications network, an indication of the number of the one or more of the first set of feedback indications that are to be indicated within the second uplink signal.

15. A method according to claim 1, wherein the number of the one or more of the first set of feedback indications that are to be indicated within the second uplink signal is predetermined and known to the communications device.

16. A method according to claim 1, wherein the one or more of the first set of feedback indications indicated within the second uplink signal are associated with the one or more of the first downlink control signals which are scheduled latest in time.

17. A method according to claim 1, wherein the one or more of the first set of feedback indications indicated within the second uplink signal are associated with the one or more of the first downlink control signals which are scheduled earliest in time.

18. A method according to claim 1, comprising
determining that the communications device is to transmit only the second uplink signal to the wireless communications network instead of both of the first uplink signal and the second uplink signal dependent on a determined preference between the first priority level and the second priority level.

19. A communications device suitable for use in a wireless communications network, the communications device comprising
transceiver circuitry configured to transmit signals and receive signals via a wireless access interface, and controller circuitry configured in combination with the transceiver circuitry to determine, based on one or more first downlink control signals received from the wireless communications network, that the communications device is to transmit a first uplink signal comprising a first set of feedback indications associated with a first priority level to the wireless communications network in a first set of uplink resources of a wireless access interface, the first set of feedback indications each indicating whether one of one or more first downlink data signals each scheduled by one of the first downlink control signals have been successfully received by the communications device, to determine, based on one or more second downlink control signals received from the wireless communications network, that the communications device is to transmit a second uplink signal comprising a second set of feedback indications associated with a second priority level different to the first priority level to the wireless communications network in a second set of uplink resources of the wireless access interface, the second set of feedback indications each indicating whether one of one or more second downlink data signals each scheduled by one of the second downlink control signals have been successfully received by the communications device, to determine that the first set of uplink resources and the second set of uplink resources are located within a same time slot or time sub-slot of the wireless access interface, to transmit only the second uplink signal to the wireless communications network instead of both of the first uplink signal and the second uplink signal, the second uplink signal comprising an indication of one or more of the first set of feedback indications, and to determine that a downlink assignment index, DAI, associated with the first set of feedback indications is reduced when the one or more of the first set of feedback indications are indicated within the second uplink signal.

20. An infrastructure equipment forming part of a wireless communications network, the infrastructure equipment comprising transceiver circuitry configured to transmit signals and receive signals via a wireless access interface provided by the infrastructure equipment, and controller circuitry configured in combination with the transceiver circuitry to determine, based on one or more first downlink control signals transmitted to a communications device by the infrastructure equipment, that the infrastructure equipment is to receive a first uplink signal comprising a first set of feedback indications associated with a first priority level from the communications device in a first set of uplink resources of a wireless access interface, the first set of feedback indications each indicating whether one of one or more first downlink data signals each scheduled by one of the first downlink control signals and transmitted by the infrastructure equipment have been successfully received by the communications device, to determine, based on one or more second downlink control signals transmitted to the communications device by the infrastructure equipment, that the infrastructure equipment is to receive a second uplink signal comprising a second set of feedback indications associated with a second priority level different to the first priority level from the communications device in a second set of uplink resources of the wireless access interface, the second set of feedback indications each indicating whether one of one or more second downlink data signals each scheduled by one of the second downlink control signals and transmitted by the infrastructure equipment have been successfully received by the communications device, to receive only the second uplink signal from the communications device instead of both of the first uplink signal and the second uplink signal, the second uplink signal comprising an indication of one or more of the first set of feedback indications, and to reduce a downlink assignment index, DAI, associated with the first set of feedback indications in response to receiving the second uplink signal comprising the indication of the one or more of the first set of feedback indications.

* * * * *